(12) United States Patent
Xue et al.

(10) Patent No.: US 11,108,054 B2
(45) Date of Patent: Aug. 31, 2021

(54) ALUMINA SUBSTRATE SUPPORTED SOLID OXIDE FUEL CELLS

(71) Applicant: UNIVERSITY OF SOUTH CAROLINA, Columbia, SC (US)

(72) Inventors: Xingjian Xue, Chapin, SC (US); Chunlei Ren, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 85 days.

(21) Appl. No.: 16/161,231

(22) Filed: Oct. 16, 2018

(65) Prior Publication Data
US 2019/0123362 A1 Apr. 25, 2019

Related U.S. Application Data

(60) Provisional application No. 62/576,735, filed on Oct. 25, 2017.

(51) Int. Cl.
| | | |
|---|---|---|
| *H01M 8/0236* | (2016.01) | |
| *H01M 8/0258* | (2016.01) | |
| *H01M 8/1226* | (2016.01) | |
| *H01M 8/0252* | (2016.01) | |
| *H01M 8/00* | (2016.01) | |

(Continued)

(52) U.S. Cl.
CPC ......... *H01M 8/0236* (2013.01); *H01M 8/004* (2013.01); *H01M 8/0252* (2013.01); *H01M 8/0258* (2013.01); *H01M 8/1226* (2013.01); *H01M 4/9033* (2013.01); *H01M 4/9066* (2013.01); *H01M 8/126* (2013.01); *H01M 2008/1293* (2013.01)

(58) Field of Classification Search
CPC .. H01M 8/0236; H01M 8/004; H01M 8/0252; H01M 8/1226; H01M 8/0258; H01M 4/9066; H01M 4/9033; H01M 2008/1293; H01M 8/126
See application file for complete search history.

(56) References Cited

U.S. PATENT DOCUMENTS

2002/0081762 A1* 6/2002 Jacobson ............ H01M 4/8885
438/32
2005/0026030 A1* 2/2005 Mardilovich ....... H01M 8/1226
429/482

(Continued)

OTHER PUBLICATIONS

Andersson, et al. "Three-Dimensional Design Optimization of an Anode-Supported SOFC using FEM" *ECS Transactions*, 57(1), (2013), pp. 2485-2494.

(Continued)

*Primary Examiner* — Michael L Dignan
(74) *Attorney, Agent, or Firm* — Dority & Manning, P.A.

(57) ABSTRACT

Solid oxide fuel cells that include an alumina substrate as support are described. The alumina substrate supported SOFCs can exhibit desirable electrochemical characteristics including high performance at intermediate temperatures and excellent thermal stability. The alumina substrate support is formed according to a modified phase-inversion process that forms a series of aligned micro-channels extending from a first side to a second opposite side of the support enabling gas distribution between an electrode (e.g., an anode) located on one side of the alumina substrate and the other, opposite side of the alumina substrate.

23 Claims, 13 Drawing Sheets

(51) Int. Cl.
  *H01M 8/126* (2016.01)
  *H01M 8/124* (2016.01)
  *H01M 4/90* (2006.01)

(56) References Cited

U.S. PATENT DOCUMENTS

| | | | | |
|---|---|---|---|---|
| 2005/0037252 | A1* | 2/2005 | Pham | H01M 4/9025 |
| | | | | 429/466 |
| 2009/0081516 | A1* | 3/2009 | Watanabe | H01M 8/2485 |
| | | | | 429/497 |
| 2011/0059388 | A1* | 3/2011 | Lee | H01M 8/2428 |
| | | | | 429/497 |
| 2016/0028091 | A1* | 1/2016 | Hwang | H01M 4/8878 |
| | | | | 427/446 |
| 2017/0338536 | A1* | 11/2017 | Fugane | H01M 2/1646 |
| 2018/0053947 | A1 | 2/2018 | Xue et al. | |

OTHER PUBLICATIONS

Atkinson, et al. "Advanced anodes for high-temperature fuel cells" *Nat Mater*, 3, (2004), pp. 17-27.

Atkinson, A. "Chemically-induced stresses in gadolinium-doped ceria solid oxide fuel cell electrolytes" *Solid State Ionics*, 95(3-4), (1997), pp. 249-258. (Abstract only).

Blennow, et al. "Planar Metal-Supported SOFC with Novel Cermet Anode" *Fuel Cells*, 11, (2011), pp. 661-668.

Blennow, et al. "Manufacturing and characterization of metal-supported solid oxide fuel cells" *J Power Sources*, 196, (2011), pp. 7117-7125.

Chen, et al. "Anode substrate with continuous porosity gradient for tubular solid oxide fuel cells" *Electrochemistry Communications*, 38, (2014), pp. 114-116.

Chen, et al. "Electrical conductivity and oxygen permeability of $Ce_{0.8}Sm_{0.2}O_{2-\delta}$—$PrBaCo_2O_{5+\delta}$ dual-phase composites" *Int J Hydrogen Energ*, 37, (2012), pp. 5277-5285.

Chen, et al. "Anode-supported micro-tubular SOFCs fabricated by a phase-inversion and dip-coating process" *Int J Hydrogen Energ*, 36, (2011), pp. 5604-5610.

Chen et al., "Assessment of $PrBaCo_2O_{5+\delta}+Sm_{0.2}Ce_{0.8}O_{1.9}$ composites prepared by physical mixing as electrodes of solide oxide fuel cells" *J Power Sources*, 195, (2010), pp. 7187-7195.

Chen, et al. "Intermediate-temperature electrochemical performance of a polycrystalline $PrBaCo_2O_{5+\delta}$ cathode on samarium-doped ceria electrolyte" *J Power Sources*, 188, (2009), pp. 96-105.

Cho, et al. "Fabrication and characterization of Ni-supported solid oxide fuel cell" *Solid State Ionics*, 180, (2009), pp. 792-795.

Ding, et al. "Enhancing SOFC cathode performance by surface modification through infiltration" *Energ Environ Sci*, 7, (2014), pp. 552-575.

Ding, et al. "A Ceramic-Anode Supported Low Temperature Solid Oxide Fuel Cell" *Electrochem Solid St*, 15(6), (2012), pp. B86-B89.

Ding, et al. "Electrochemical performance of $BaZr_{0.1}Ce_{0.7}Y_{0.1}Yb_{0.1}O_{3-\delta}$ electrolyte based proton-conducting SOFC solid oxide fuel cell with layered perovskite $PrBaCo_2O_{5\delta}$ cathode" *J Power Sources*, 196, (2011), pp. 2602-2607.

Ding, et al. "High performance anode-supported solid oxide fuel cell based on thin-film electrolyte and nanostructured cathode" *Energ Environ Sci*, 3, (2010), pp. 1729-1731.

Ding, et al. "$PrBa_{0.5}Sr_{0.5}Co_2O_{5+\delta}$ layered perovskite cathode for intermediate temperature solid oxide fuel cells" *Electrochim Acta*, 55, (2010), pp. 3812-3816.

Ding, et al. "Layered perovskite $GdBaCoFeO_{5+x}$ as cathode for intermediate-temperature solid oxide fuel cells" *Int J Hydrogen Energ*, 35, (2010), pp. 4316-4319.

Droushiotis, et al. "Comparison between anode-supported and electrolyte-supported Ni-CGOLSCF micro-tubular solid oxide fuel cells" *Fuel Cells*, 14(2), (2014), pp. 200-211.

Droushiotis, et al. "Fabrication by Co-extrusion and electrochemical characterization of micro-tubular hollow fibre solid oxide fuel cells" *Electrochemistry Communications*, 12, (2010), pp. 792-795.

Duan, et al. "High performance anode-supported tubular solid oxide fuel cells fabricated by a novel slurry-casting method" *Sci Rep.*, 5:8174 (2015), pp. 1-4.

Graves, et al. "Eliminating degradation in solid oxide electrochemical cells by reversible operation" *Nat Mater*, 14, (2015), pp. 239-244.

He, et al. "Effect of nickel impregnated hollow fiber anode for micro tubular solid oxide fuel cells" *J Power Sources*, 258, (2014), pp. 391-394

Huang, et al. "Facile one-step forming of NiO and yttrium-stabilized zirconia composite anodes with straight open pores for planar solid oxide fuel cell using phase-inversion tape casting method" *J Power Sources*, 274, (2015), pp. 1114-1117.

Huang, et al. "Double Perovskites as Anode Materials for Solid-Oxide Fuel Cells" *Science*, 312, (2006), pp. 254-257.

Irvine, et al. "Evolution of the electrochemical interface in high temperature fuel cells and electrolysers" *Nature Energ*, 1, (2016), pp. 1-26.

Kanawka, et al. "Microstructure and Performance Investigation of a Solid Oxide Fuel Cells Based on Highly Asymmetric YSZ Microtubular Electrolytes" *Ind Eng Chem Res*, 49. (2010), pp. 6062-6068.

Kim, et al. "Advanced Electrochemical Properties of $LnBa_{0.5}Sr_{0.5}Co_2O_{5+\delta}$ (Ln=Pr, Sm, and Gd) as Cathode Materials for IT-SOFC" *Journal of the Electrochemical Society*, 156(6), (2009), pp. B682-B689.

Kim, et al. "Polarization Effects in Intermediate Temperature, Anode-Supported Solid Oxide Fuel Cells" *Journal of the Electrochemical Society*, 146, (1999), pp. 69-78.

La O', et al. "Catalytic Activity Enhancement for Oxygen Reduction on Epitaxial Perovskite Thin Films for Solid-Oxide Fuel Cells" *Angew Chem Int Edit*, 49, (2010), pp. 5344-5347.

Lawlor, V. "Review of the micro-tubular solid oxide fuel cell (Part II: Cell design issues and research activities)" *J Power Sources*, 240, (2013), pp. 421-441.

Lee, et al. "Fabrication and electrochemical properties of SOFC single cells using porous yttria-stabilized zirconia ceramic support layer coated with Ni" *J Eur Ceram Soc*, 34, (2014), pp. 1771-1776. (Abstract only).

Li, et al. "Co-extrusion of electrolyte/anode functional layer/anode triple-layer ceramic hollow fibres for micro-tubular solid oxide fuel cells-electrochemical performance study" *J Power Sources*, 273, (2015), pp. 999-1005.

Li, et al. "Single-step fabrication and characterisations of triple-layer ceramic hollow fibres for micro-tubular solid oxide fuel cells (SOFCs)" *Journal of Membrane Science*, 449, (2014), pp. 1-8.

Liu, et al. "Microstructure Tailoring of the Nickel Oxide-Yttria-Stabilized Zirconia Hollow Fibers toward High-performance Microtubular Solid Oxide Fuel Cells" *Acs Appl Mater Inter*, 6(21), (2014), pp. 18853-18860. (Abstract only).

Liu, et al. "An Efficient SOFC Based on Samaria-Doped Ceria (SDC) Electrolyte" *Journal of The Electrochemical Society*, 159(6), (2012), pp. B661-B665.

Matus, et al. "Metal-supported solid oxide fuel cell membranes for rapid thermal cycling" *Solid State Ionics*, 176, (2005), pp. 443-449.

Meng, et al. "Highly stable microtubular solid oxide fuel cells based on integrated electrolyte/anode hollow fibers" *J Power Sources*, 275, (2015), pp. 362-369.

Meng, et al. "Novel cathode-supported hollow Fibers for light weight micro-tubular solid oxide fuel cells with an active cathode functional layer" *Journal of Materials Chemistry A*, 3, (2015), pp. 1017-1022.

Morales, et al. "The effect of anode support on the electrochemical performance of microtubular solid oxide fuel cells fabricated by gel-casting" *RSC Advances*, 5(49), (2015), pp. 39350-39357.

Othman, et al. "High-Performance, Anode-Supported, Microtubular SOFC Prepared from Single-Step-Fabricated, Dual-Layer Hollow Fibers" *Adv Mater*, 23, (2011), pp. 2480-2483.

(56) References Cited

OTHER PUBLICATIONS

Othman, et al. "Morphological studies of macrostructure of Ni—CGO anode hollow fibres for intermediate temperature solid oxide fuel cells" *J Membrane Sci*, 360, (2010), pp. 410-417.
Otomo, et al. "Evaluation of cost reduction potential for 1 Kw class SOFC stack production: Implications for SOFC technology scenario" *Int J Hydrogen Energ*, 38, (2013), pp. 14337-14347.
Panthi, et al. "Fabrication and Evaluation of a Micro-Tubular Solid Oxide Fuel Cell with an Inert Support Using Scandia-Stabilized Zirconia Electrolyte" *Journal of the Electrochemical Society*, 162, (2015), pp. F1555-F1560.
Panthi, et al. "Micro-tubular solid oxide fuel cell based on a porous yttria-stabilized zirconia support" *Sci Rep.*, 4, (2014), pp. 5754.
Panthi, et al. "Development of a High-Performance Micro-Tubular SOFC based on a Hollow Fiber Support" *EFS Transactions*, 57(1), (2013), pp. 789-798.
Peksen, et al. "3D transient thermomechanical behaviour of a full scale SOFC short stack" *Int J Hydrogen Energ*, 38, (2013), pp. 4099-4107.
Pham, et al. "Electrical and Oxidation Resistance of Surface Oxide of Porous Fe—Cr—Al Alloy for the Application of Metal Supported SOFCs" *ECS Transactions*, 68(1), (2015), pp. 1715-1720.
Primdahl, et al. "Gas Diffusion Impedance in Characterization of Solid Oxide Fuel Cell Anodes" *J Electrochem Soc*, 146(8), (1999), pp. 2827-2833.
Primdahl, et al. "Gas Conversion Impedance: A Test Geometry Effect in Characterization of Solid Oxide Fuel Cell Anodes" *J Electrochem Soc*, 145(7), (1998), pp. 2431-2438.
Ren, et al. "Fabrication and Characterization of High Performance Intermediate Temperature Micro-Tubular Solid Oxide Fuel Cells" *Journal of the Electrochemical Society*, 163(9), (2016), pp. F1115-F1123.
Rodriguez-Martinez, et al. "Degradation Studies on Tubular Metal Supported SOFC" *ECS Transactions*, 25, (2009), pp. 745-752.
Roehrens, et al. "Redox-stability of a Planar Metal-supported SOFC" *Solid Oxide Fuel Cells* 13 (*Sofc-Xiii*), 57, (2013), pp. 665-672.
Sammes, et al. "A Study of GDC-Based Micro Tubular SOFC" *Mater Sci Forum*, 638-642, (2010), pp. 1152-1157. (Abstract only).
Schiller, et al. "High temperature water electrolysis using metal supported solid oxide electrolyser cells (SOEC)" *J Appl Electrochem*, 39, (2009), pp. 293-301.
Shao, et al. "A Microchanneled ceramic membrane for highly efficient oxygen separation" *J Mater Chem A*, 1, (2013), pp. 9641-9644.
Shao, et al. "A high-performance cathode for the next generation of solid-oxide fuel cells" *Nature*, 431, (2004), pp. 170-173.
Son, et al. "Effect of Anode Support Thickness on the Performance of Tubular SOFCs" *ECS Transactions*, 7(1), (2007), pp. 543-549.
Steele, et al. "Materials for fuel-cell technologies" *Nature*, 414, (2001), pp. 345-352.
Suzuki, et al. "Impact of Anode Microstructure on Solid Oxide Fuel Cells" *Science*, 325, (2009), pp. 852-855.
Suzuki, et al. "Fabrication and characterization of micro tubular SOFCs for advanced ceramic reactors" *J Alloy Compd*, 451, (2008), pp. 632-635.
Suzuki, et al. "Anode-supported micro tubular SOFCs for advanced cermaic reactor system" *J Power Sources*, 171, (2007), pp. 92-95.
Suzuki, et al. "Design and Fabrication of Lightweight, Submillimeter Tubular Solid Oxide Fuel Cells" *Electrochem Solid St*, 10(8), (2007), pp. A177-A179.
Suzuki, et al. "Current collecting efficiency of micro tubular SOFCs" *J Power Sources*, 163, (2007), pp. 737-742.
Tucker, M.C. "Progress in metal-supported solid oxide fuel cells: A review" *J Power Sources*, 195, (2010), pp. 4570-4582.
Tucker, et al. "Stability and robustness of metal-supported SOFCs" *J Power Sources*, 175, (2008), pp. 447-451.
Tucker, et al. "Performance of metal-supported SOFCs with infiltrated electrodes" *J Power Sources*, 171(2), (2007), pp. 477-482.
Wang, et al. "Electrochemical characteristics of nano-structured $PrBaCo_2O_{5+x}$ cathodes fabricated with ion impregnation process" *J Power Sources*, 203, (2012), pp. 34-41.
Wachsman, et al. "Lowering the Temperature of Solid Oxide Fuel Cells" *Science*, 334, (2011), pp. 935-939.
Wei, et al. "Yttria-Stabilized Zirconia (YSZ)-Based Hollow Fiber Solid Oxide Fuel Cells" *Ind Eng Chem Res*, 47, (2008), pp. 1506-1512.
Xiao, et al. "Fabrication and electrochemical characterization of anode-supported microtubular solid oxide fuel cells based on $Ce_{0.8}Sm_{0.2}O_{2-\delta}$ Electrolytes" *Int J Appl Ceram Tec*, 9, (2012), pp. 1064-1070.
Xu, et al. "SiC nanofiber reinforced porous ceramic hollow fiber membranes" *J Mater Chem A*, 2, (2014), pp. 5841-5846. (Abstract only).
Yang, et al. "Perovskite $Sr_{1-x}Ce_xCoO_{3-\delta}$ ($0.05 \leq x \leq 0.15$) as Superior Cathodes for Intermediate Temperature Solid Oxide Fuel Cells" *Acs Appl Mater Inter*, 5, (2013), pp. 1143-1148.
Yang, et al. "Micro-tubular solid oxide fuel cells fabricated by phase-inversion method" *Electrochemistry Communications*, 12, (2010), pp. 657-660.
Yang, et al. "Fabrication and Characterization of Ce0.8Sm0.2O1.9 Microtubular Dual-Structured Electrolyte Membranes for Application in Solid Oxide Fuel Cell Technology" *J Am Ceram Soc*, 92(11), (2009), pp. 2544-2550.
Yang, et al. "Fabrication and evaluation of electrolyte-supported hollow fiber solid oxide fuel cells" *Adv Mat Res*, 79-82, (2009), pp. 1691-1694.
Yang, et al. "Enhanced Sulfur and Coking Tolerance of a Mixed Ion Conductor for SOFCs: $BaZr_{0.1}Ce_{0.7}Y_{0.2-x}Yb_xO_{3-\delta}$" *Science*, 326, (2009), pp. 126-129.
Yang, et al. "A phase inversion/sintering process to fabricate nickel/yttria-stabilized zirconia hollow fibers as the anode support for micro-tubular solid oxide fuel cells" *J Power Sources*, 183, (2008), pp. 14-19.
Yin, et al. "Highly asymmetric yttria stabilized zirconia hollow fibre membranes" *J Alloy Compd*, 476, (2009), pp. 566-570.
Zhang, et al. "Thermally sprayed high-performance porous metal-supported solid oxide fuel cells with nanostructured $La_{0.6}Sr_{0.4}Co_{0.2}Fe_{0.8}O_{3-\delta}$ cathodes" *J Mater Chem A*, 4, (2016), pp. 7461-7468. (Abstract only).
Zhao, et al. "$BaZr_{0.1}Ce_{0.7}Y_{0.2}O_{3-\delta}$ as an electronic blocking material for microtubular solid oxide fuel cells based on doped ceria electrolyte" *Electrochemistry Communications*, 13, (2011), pp. 450-453.
Zheng, et al. "Effects of Magnetic Fields on Microbiologically Infuenced Corrosion of 304 Stainless Steel" *Ind Eng Chem Res*, 53, (2014), pp. 48-54.
Zhu, et al. "Metal-Supported Solid Oxide Fuel Cell with $La_{0.4}Sr_{0.6}Co_{0.2}Fe_{0.7}Nb_{0.1}O_{3-\delta}$ Cathode" *Journal of the Electrochemical Society*, 163(2), (2016), pp. F122-F125.
Zhu, et al. "Electrochemical performance of $PrBaCo_2O_{2+\delta}$ layered perovskite as an intermediate-temperature solid oxide fuel cell cathode" *J Power Sources*, 185, (2008), pp. 193-196.

\* cited by examiner

ALUMINA SUBSTRATE SUPPORTED SOLID OXIDE FUEL CELLS

CROSS REFERENCE TO RELATED APPLICATION

This application claims filing benefit of U.S. Provisional Patent Application Ser. No. 62/576,735 having a filing date of Oct. 25, 2017, which is incorporated herein by reference for all purposes.

FEDERAL RESEARCH STATEMENT

This invention was made with Government support under Grant No. NNX14AB26G, awarded by the National Aeronautics and Space Administration. The Government has certain rights in the invention.

BACKGROUND

Solid oxide fuel cells (SOFCs) are energy conversion devices that convert the chemical energy of fuels and oxidant directly into electrical energy in an environmentally benign and highly efficient manner. The basic structure of an SOFC is a tri-layer assembly, in which a dense electrolyte is sandwiched between porous anode and cathode electrodes. Since the resistance of the electrolyte is proportional to its thickness, a thin film electrolyte is usually employed to reduce ohmic loss. This leads to electrode-supported SOFC designs, one example of which is illustrated in FIG. 1, which illustrates one half of a microtubular SOFC in a cross-sectional view. As shown, one relatively thick electrode 2 is used to provide mechanical strength for the entire cell including the electrolyte 4 and the second electrode 6. As polarization loss of the cathode electrode is a major factor limiting overall SOFC efficiency due to the sluggish oxygen reduction reactions (ORRs), anode-supported designs have been widely employed as they can often provide better electrochemical performance.

No matter whether it is the cathode or the anode, the supporting electrode plays several roles simultaneously in an SOFC including fuel/gas diffusion and distribution toward or away from electrochemical reaction sites, catalysis for oxidation or reduction at reaction sites, current collection or distribution, and support for external mechanical loadings induced by cell/stack assembly and operating conditions, e.g., support for mechanical and thermal as well as chemical stresses.

Electrochemical reaction sites of a cell are formed at a triple phase boundary where the electronic conducting phase (e.g., nickel), the ionic conducting phase (e.g., electrolyte material) and the gas phase meet. Although the triple phase boundary sites are uniformly distributed in most electrodes, studies have shown that electrochemical reactions take place mainly within a narrow range near the bulk electrode/electrolyte interface. Accordingly, most of the volume of the supporting electrode is utilized only for support while electrochemical reactions and current flow are carried out at a relatively thin functional layer near the bulk electrode/electrolyte interface.

Unfortunately, electrode materials such as rare-earth-based materials are expensive, and use of such expensive materials as little more than supporting substrates adds unnecessary expense to SOFCs. For instance, the anode electrode can account for more than 90% of the materials used in an anode-supported SOFC. As such, the total material cost of an electrode-supported SOFC unit cell is largely dominated by the cost of the supporting electrode. For example, an Ni-YSZ anode in an anode-supported electrode may account for nearly 40% of all of the material costs of a 1 kW-class SOFC stack.

Metal-supported SOFCs have been studied in an attempt to improve mechanical strength and redox tolerance as well as thermal cycling capability of SOFCs. Metal support materials have included Ni, FeNi, FeCr, NiCrAlY and ferritic stainless steel. However, metal-supported SOFC designs can suffer from cathode poison induced by inter-diffusion of the metal component as well as mechanical property degradation of the metal substrate at high temperatures. Yttria-stabilized zirconia (YSZ) has also been used as anode substrate in an attempt to improve structural reliability of SOFCs.

What are needed in the art are SOFCs and methods for forming SOFCs that can provide desirable electrochemical functionality at lower costs. More specifically, what are needed are SOFCs and methods that include a low cost supporting substrate that does not interfere with electrochemical function of the SOFC.

SUMMARY

According to one embodiment, disclosed is a solid oxide fuel cell that includes an alumina substrate support. The alumina substrate support can include micro-channels that allow for gas dissemination from a first side to an opposite second side of the alumina substrate. The solid oxide fuel cell can also include a first electrode adjacent to the second side of the alumina substrate, an electrolyte adjacent to the first electrode, and a second electrode adjacent to the electrolyte such that the electrolyte is sandwiched between the first and second electrodes. Optionally, the SOFC can include a barrier layer between the alumina substrate support and the first electrode, which can prevent diffusion of materials between the active SOFC components and the alumina substrate.

Also disclosed are methods for forming a supported SOFC. For instance, a method can include shaping a precursor substrate composition that includes an alumina powder, a polymeric binder, and a solvent. In one particular embodiment, the composition can be extruded as a hollow tube in formation of a microtubular SOFC. The shaped composition can be contacted with a mixture of a solvent (that can be the same or different as the solvent of the composition) and anti-solvent according to a modified phase inversion process to form a porous coagulated green body. More specifically, the mixture of the solvent and the anti-solvent used during the phase inversion process can include a weight ratio of the solvent to the anti-solvent of from about 98:2 to about 90:10. In those embodiments in which a tubular green body is formed, the mixture of solvent and anti-solvent can be utilized as an internal coagulant and a solution including a higher amount of the anti-solvent (e.g., including no solvent) can be utilized as an external coagulant. The green body can then be sintered to provide the alumina substrate support. A method can also include forming a first electrode, an electrolyte and a second electrode on the alumina substrate to provide the alumina substrate supported SOFC.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
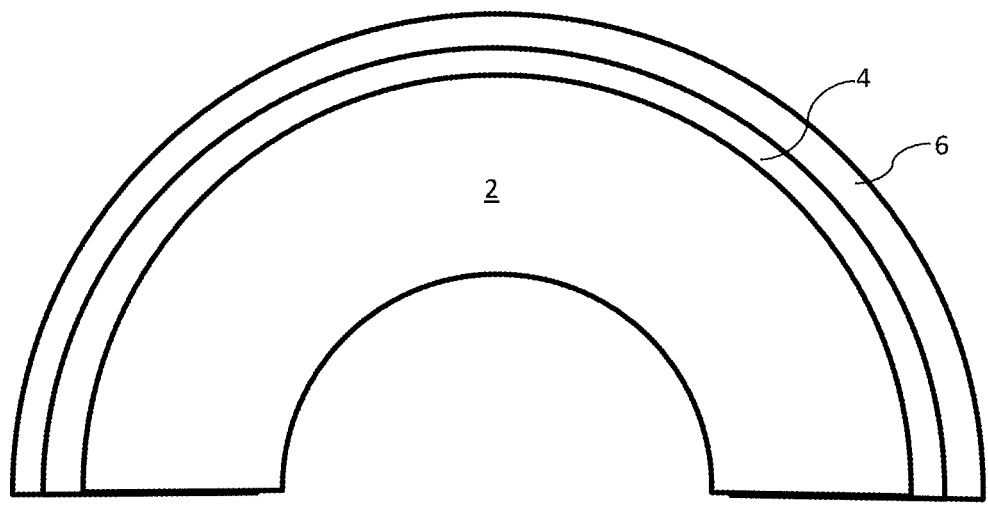
FIG. 1 is a schematic illustration of half of a conventional prior art micro-tubular SOFC shown in cross section.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are SOFCs that include an alumina substrate as support. The alumina substrate supported SOFCs can exhibit desirable electrochemical characteristics including high performance at intermediate temperatures. As discussed above, a large portion of the supporting electrode of conventional SOFCs is utilized almost exclusively for support of the active portions of the cell. As such, replacement of this supporting portion of the cell with a less expensive material that will not interfere with the electrochemical action of the cell would be of great benefit. The disclosed cells utilize aluminum oxide (commonly referred to as alumina) in formation of an SOFC supporting substrate. Aluminum oxide is common, and the cost of aluminum oxide is much lower than that of rare-earth element oxides commonly utilized in electrodes. Through utilization of an alumina-based substrate as support for an SOFC, the capital cost of SOFCs can be significantly reduced.

The excellent chemical and mechanical stability of products made from aluminum oxide have been well demonstrated from research laboratories to industrial applications. Employment of an alumina-based substrate as SOFC support can not only decrease SOFC costs, but can also significantly improve the robustness, reliability and endurance of SOFCs. Planar and tubular design are two kinds of classic SOFC designs as may beneficially incorporate an alumina substrate support as described. Micro-tubular SOFCs often provide advantages over classic designs, and therefore have attracted increasing attentions in recent years. While much of the following discussion is directed to microtubular SOFCs that incorporate an alumina substrate support, it should be understood that the disclosure is in no way limited to microtubular SOFCs, and the disclosed alumina substrate supported SOFCs are applicable to any known SOFC design.

Figure 2:
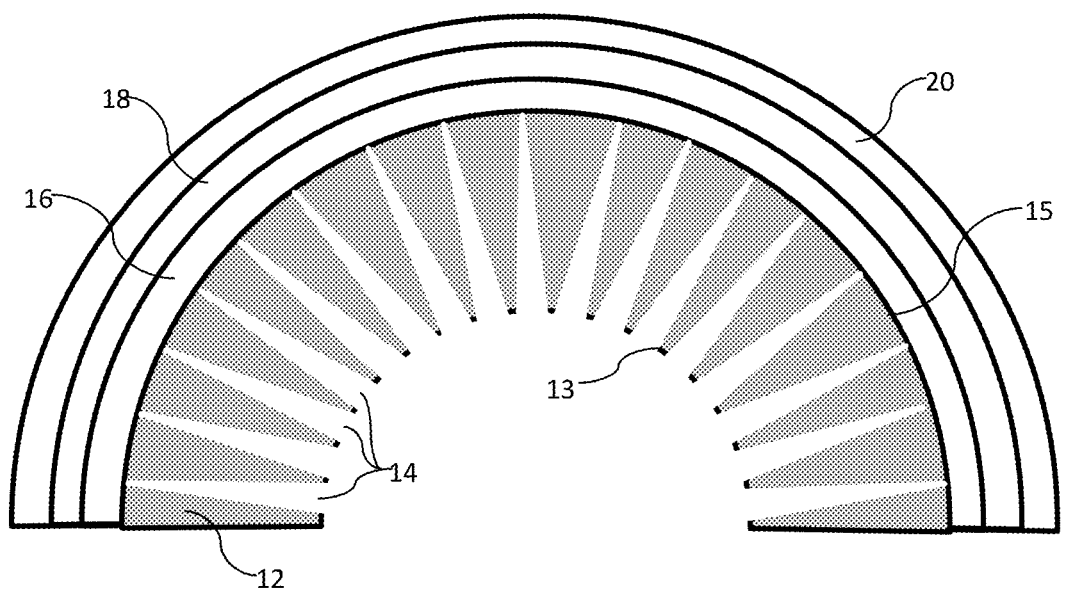
FIG. 2 is a schematic illustration of half of an alumina substrate-supported SOFC as described herein shown in cross section.

FIG. 2 schematically illustrates one embodiment of an alumina substrate-supported micro-tubular SOFC design disclosed herein. As shown, the SOFC includes an alumina substrate 12 as support for the cell. To obtain facile fuel/gas diffusion and distribution, a plurality of micro-channels 14 are embedded into the alumina substrate. As shown in the microtubular design illustrated in FIG. 2, the micro-channels 14 can be radially well-aligned so as to provide gas distribution from the inner side 13 of the substrate 12 to the outer opposite side 15 of the substrate 12. Relatively thin electrode layer 16, electrolyte layer 18, and cathode layer 20 can then be built upon the thick alumina substrate 12. The electrode layer 16 that is adjacent to the substrate 12 can be the anode in one embodiment, but the SOFCs are not limited to this design, and in other embodiments, the cathode can be in proximity to the alumina substrate 12 with the anode on the opposite side of the electrolyte layer 18.

The porosity of the alumina substrate 12 can provide desirable gas permeability to the SOFC. For instance, the gas permeability of an alumina substrate 12 can reach about $70 \times 10^5$ $Lm^{-2}h^{-1}$ in some embodiments, approximately ten times that of conventional substrates, for instance from about $40 \times 10^5$ $Lm^{-2}h^{-1}$ to about $100 \times 10^5$ $Lm^{-2}h^{-1}$ in some embodiments. The alumina substrate-supported SOFCs can also exhibit excellent electrochemical characteristics. For example, a material system including a nickel oxide/samaria-doped ceria (NiO-SDC) anode, SDC electrolyte, and praseodymium-doped barium cobalt oxide (e.g., $PrBaCo_2O_{5+\delta}$ (PBCO)) cathode can demonstrate a peak power density of from about 1400 mW $cm^{-2}$ at 600° C. to about 1450 mW $cm^{-2}$ at 600° C., for instance about 1420 mW $cm^{-2}$ at 600° C., which is among the best performance of SOFCs with the same material system in open literature. In addition, the SOFCs can demonstrate excellent thermal cycling stability, as described further in the Examples section below.

The alumina substrate support structure can be formed in one embodiment according to a modified phase inversion process, which can create a series of well-aligned microchannels across the substrate that are open at the inner surface of the substrate.

The modified phase inversion process can include formation of an alumina-based precursor composition that can then be shaped to the desired form of the SOFC support. The precursor composition can include an alumina powder in conjunction with a binder and solvent and optionally with other components such as sintering aides, dispersants, etc., examples of which are discussed further herein. The alumina powder is not particularly limited, and commercially available materials can be utilized. For instance, the alumina powder can have an average particle size of about 1 micrometer or less, for instance about 0.75 micrometers or less, or from about 0.1 to about 0.75 micrometers in some embodiments. In general, the solids content (e.g., the content of the alumina powders in the composition) can be about 80% by weight or less, about 75% or less, or about 70% or less of the precursor substrate composition.

The binder of the precursor composition is not particularly limited and conventionally known organic binders can be appropriately used. As the formation process can include a phase inversion process, binders for use in forming the alumina substrate can generally include those that are soluble in the solvent of the composition and insoluble in the anti-solvent used in the phase inversion process. Some examples of suitable polymer binders include, without limitation, polyethersulfone (PESf), ethylene-vinyl alcohol (EVAL), cellulose acetate (CA), polysulfone (Psf), polyacrylonitrile (PAN), cellulosics, polyvinylidone fluoride (PVDF), polyimides (PI), polyamides (PA), acrylonitrile butadiene styrene (ABS), polycarbonate (PC), polylactic acid (PLA), high density polyethylene (HDPE), PC/ABS, and polyphenylsulfone (PPSU) or mixtures thereof. The amount of the polymer binder that is used may contribute to the final structure of the substrate support. The weight ratio of polymer to solvent in the precursor composition can be, for example, in the range from about 10% to about 50%.

The precursor substrate composition can include a solvent that can enable phase inversion to occur. The solvent can be one that is miscible with the anti-solvent, and may be referred to as an anti-solvent miscible solvent. The solvent can also be one that is suitable for dissolving the binder (as well as other components of the composition as desired). Suitable examples of the solvent can include, without limitation, 1-Methyl-2-pyrrolidinone (NMP), acetone, dimethylsulfoxide (DMSO), dimethyl formamide (DMF) and tetrahydrofuran (THF), dimethylacetamine (DMAc), formyl piperidene (FP), dioxane, acetic acid (HAc), morpholine (MP) and mixtures thereof.

In one embodiment, the precursor composition can also include a sintering aide. For example, the addition of NiO to the composition as a sintering aid can significantly improve the bending strength of an alumina substrate while forming an $NiAl_2O_4$ spinel phase in the alumina-based substrate. Moreover, addition of a sintering aid to the composition can facilitate the densification of the thin film electrolyte at the cell sintering stage of a formation process. The $NiAl_2O_4$ spinel phase formed by NiO and $\alpha$-$Al_2O_3$ can also improve the redox stability of the substrate. Other sintering aids, e.g., CuO, ZnO could also be used. A sintering aid can generally be included in a precursor alumina composition in an amount of about 10 wt. % or less.

The alumina substrate precursor composition can also include one or more additional components as are generally known in the art. One example of such an additional component is a dispersant that can prevent the components of the composition from clumping. Clumping can result in a non-homogeneous solution and a non-uniform article, which is undesirable. Examples of suitable dispersants include polyvinylpyrrolidone (PVP), polyethylene glycol, prionic acid or surfactants such as Span-80.

Figure 3:
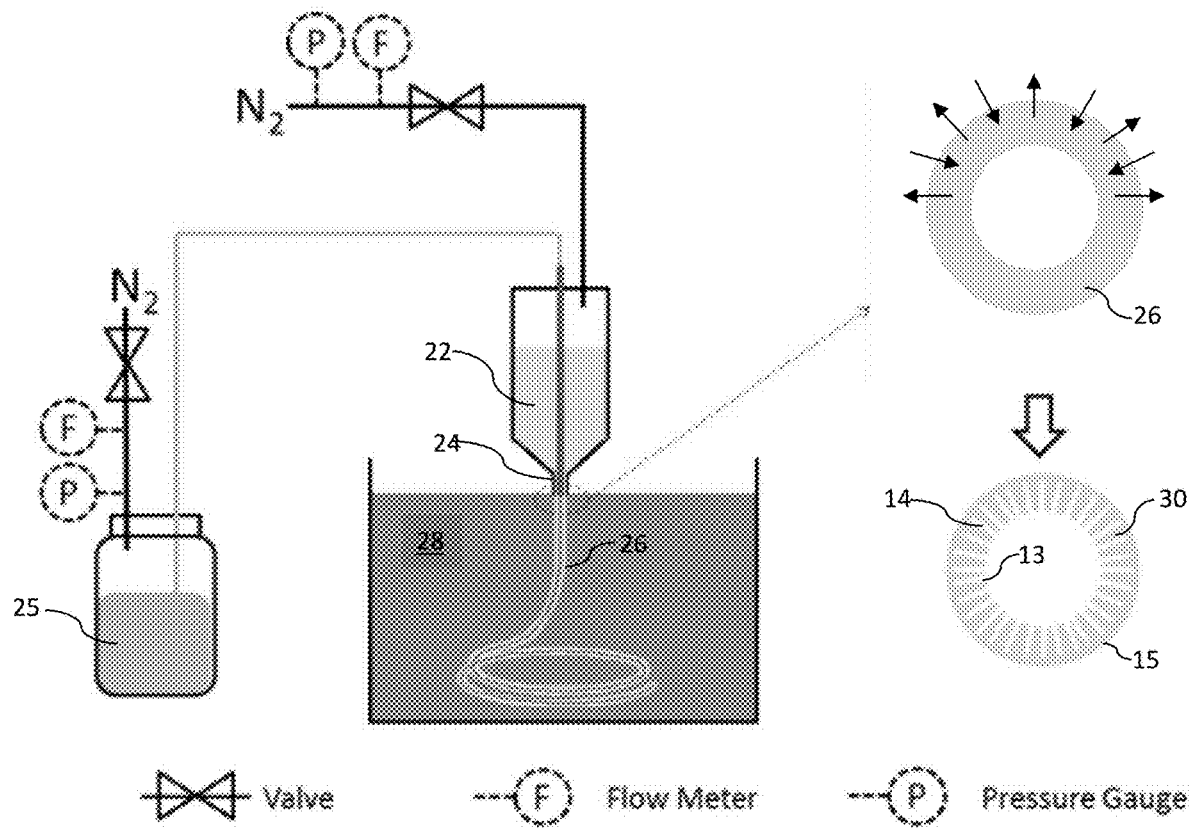
FIG. 3 schematically illustrates one method for forming an alumina substrate support.

FIG. 3 schematically illustrates an alumina substrate support formation process. As shown, an alumina slurry 22 (i.e., the precursor composition) can be loaded into an extruder 24, e.g., a spinneret. In the illustrated embodiment, the slurry 22 is extruded in conjunction with an internal anti-solvent solution 25 that can flow through a central channel of the spinneret such that the alumina composition extrudate is in the form of a hollow tube 26. While there is no particular requirement as to the thickness (i.e., wall thickness) of the support substrates, in general, a microtubular extrudate can generally be formed such that upon sintering (which can include some shrinkage), the sintered support can be about 500 micrometers or less in thickness, e.g., from about 100 micrometers to about 500 micrometers, in some embodiments.

The extrudate tubular body 26 thus formed can be subjected to a phase inversion process, also referred to as a solvent exchange process, which can solidify the polymer binder and form porosity in the extrudate tubular body 26 thereby forming a precursor tube 30 (i.e., a green body). The phase inversion includes immersion of the extrudate tubular body 26 into a bath 28 that includes an anti-solvent (also referred to herein as a coagulation bath).

Figure 4:
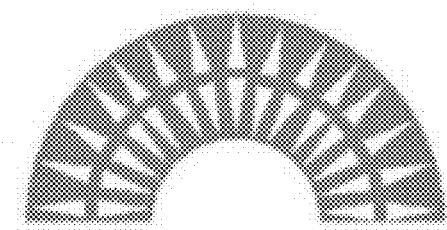
FIG. 4 illustrates coagulation results according to a standard phase inversion process (top) compared to that according to a modified phase inversion process as utilized herein (bottom).
Figure 4:
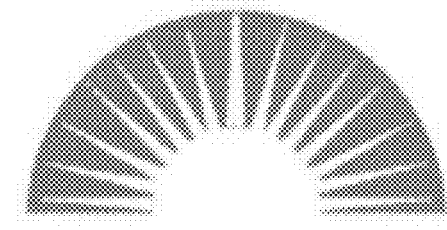

In conventional phase-inversion methods for micro-tube extrusion, tap water is used as both the outer and inner coagulants. As a result, relatively large concentration gradients of the solvent (e.g., NMP) can exist between the body of extruded substrate precursor and the inner/outer coagulants (water). These gradients drive the exchange between the solvent in the substrate and the anti-solvent. The depletion of solvent in the substrate creates finger-like pores and solidifies the substrate. Unfortunately, this exchange process also generates a sponge-like layer in the middle of the substrate, cutting off the finger-like pores. Meanwhile, relatively dense skin layers are created on the inner and outer surface of the micro-tubular substrate (FIG. 4, top). Experimental measurements have verified that the micro-tubular substrates with such microstructure features show disadvantages for facile fuel/gas transport and electrochemical performance of the corresponding SOFCs. To overcome this issue, the disclosed modified phase-inversion process utilizes a mixture of solvent and anti-solvent as a coagulant (e.g., the internal coagulant in formation of a microtubular support), this mixture has a relatively high proportion of solvent (e.g., a weight ratio of solvent to anti-solvent of from about 98:2 to about 90:10, or about 95:5 in some embodiments). When forming a microtubular support, a solution having a higher proportion of anti-solvent (e.g., a solution with no solvent included) can be used as the external coagulant.

Through utilization of the relatively high solvent concentration coagulant on at least one side of the extruded body, the concentration gradient of solvent in the extruded substrate and internal coagulant can be significantly decreased. This in turn can hinder the exchange between solvent in the substrate and anti-solvent in the internal coagulant, essentially leaving as the only exchange process the exchange between solvent in the substrate and anti-solvent in outer coagulant. Accordingly, the formation of a middle sponge-like layer and inner surface skin layer can be avoided in the substrate, and the radially well-aligned micro-channels can be formed in the substrate that are open at the inner surface of the substrate as shown in FIG. 4 (bottom). The microtubular alumina substrate with such microstructural features can significantly improve fuel/gas diffusion and electrochemical performance of the cells formed with the alumina substrate as support.

Referring again to FIG. 3, upon the immersion of the tubular body 26 into the receiving solvent bath 28, the solvent of the alumina slurry 22 exchanges with the anti-solvent of the bath 28 as indicated by the directional arrows in the cross sectional view of the extrudate tubular body 26. This exchange leads to precipitation of the polymer binder (and optionally additional polymers such as a dispersant) from solution within the tubular body. The polymer solidification of the phase inversion solidifies the precursor tubular body 26 and also forms porosity in the precursor tube 30.

There is no particular requirements for how to locate the precursor tubular body 26 in the anti-solvent phase inversion bath 28. For instance, the tubular body 26 may be placed into the coagulation bath 28 following extrusion, or the bath 28 may be arranged such that a tubular body extrudate can be fed continuously from the extruder 24 into the bath 28 with little or no air gap between the tip of the spinneret orifice and the surface of the bath.

Upon immersion, and during the solvent exchange process, the polymer solvent, which is miscible with the anti-solvent in the bath 28, begins to disperse out of the tubular body 26 to mix with the anti-solvent bath, being continuously replaced in the tubular body 26 with anti-solvent. As the exchange of solvent for anti-solvent transpires within the tubular body 26, the composition of the tube changes from dissolved polymer and solvent to a mixture of polymer, solvent and anti-solvent, with the percentage of anti-solvent continuously increasing. Thus, the solubility of the polymer is negatively affected, and the polymer begins to precipitate out of solution when the anti-solvent attains a sufficiently high percentage within the tube. Eventually, the anti-solvent substantially replaces all of the solvent within the body, the polymer solidifies, and porosity is formed in the tube walls of the precursor tube 30, as shown in FIG. 3.

The modified phase inversion process may be allowed to progress over a period of time that can depend on the thickness of the walls and the slurry composition. In general, however, the phase inversion process may be carried out over a period of time from about 10 minutes to about 48 hours. For example, the phase inversion may be allowed to continue for a period of about 24 hours in one embodiment.

As schematically illustrated in FIG. 3 and FIG. 4, following the modified phase inversion process, the precursor tube 30 can exhibit a series of micro-channels 14 across the cross section of the tube. In particular, and as illustrated in FIG. 3, following phase inversion, the coagulated precursor tube 30 can exhibit a porous microstructure that extends from a first side 13 of the tube to the second opposite side 15 of the tube.

Following solidification, the precursor tube 30 can be dried, fired, and sintered to remove organic components and achieve sufficient mechanical strength for further processing. For instance, the precursor tube 30 can be dried in air, fired at a temperature of from about 800° C. to about 1000° C., and then sintered at a temperature of about 1000° C. or greater, e.g., from about 1200° C. to about 1500° C. in some embodiments. The preferred sintering temperature can depend upon the components included in the substrate precursor composition as well as the geometry and size of the precursor tube 30. For instance, in those embodiments in which the precursor composition includes a sintering aid that can react with the alumina during sintering (e.g., reaction of NiO with alumina to form an $NiAl_2O_4$ spinel phase), the sintering temperature can be high enough (e.g., about 1200° C. or greater) to encourage the desired reactions.

In one embodiment, a porous barrier layer can be formed on the substrate prior to forming the electrode and electrolyte layers of the SOFC. A barrier layer can be beneficial to inhibit components of adjacent layers from diffusing into one another. For instance a porous barrier layer can prevent NiO in an adjacent anode layer from diffusing into the substrate during high temperature sintering process carried out during SOFC formation. A barrier layer can be formed of a suitable buffer material for the SOFC. By way of example, a porous barrier layer can be formed of the same material as is used in forming the electrolyte layer, e.g., a ceria-based composition such as samarium doped ceria (SDC) or gadolinium doped ceria (GDC). To form a barrier layer a composition can be formed including the desired material (e.g., SDC) and a suitable pore forming component (e.g., graphite powder) in conjunction with a solvent and binder as well as any other components as generally known in the art (e.g., dispersant, plasticizer, etc.). The composition can then be applied to a surface of the formed substrate (e.g., the outer surface 15 of a microtubular alumina substrate as illustrated in FIG. 3) prior to formation of the electrode and electrolyte layers.

A barrier composition can be applied to a surface of the alumina substrate either prior to or following sintering of the alumina substrate. For instance, in one embodiment, following an initial low temperature firing of the substrate and prior to final sintering, a barrier composition can be applied to the surface. An application process is not particularly limited, and a preferred method can depend on some embodiments on the design of the SOFC. By way of example, a barrier composition can be applied by dip-coating, brush coating, etc., as are known in the art for application of electrode and electrolyte layers. Multiple coatings can be applied, with air drying between coatings, to build the layer to a desired thickness. Following application of one or multiple coating layers, the barrier composition can then be sintered, either in conjunction with sintering of the alumina substrate and/or an electrode layer formed on the barrier layer, or in a single-layer sintering process, as desired.

Electrode and electrolyte layers can be fabricated on a surface of the alumina support substrate through alternate coating and sintering processes. The electrode and electrolyte materials can generally include any ceramic suitable for use in a solid oxide cell. The thickness of the electrode and electrolyte layers following all formation steps (including sintering) can generally be on the order of about 50 micrometers or less, for instance from about 10 μm to about 20 μm in some embodiments, with different layers having the same or different thicknesses from one another, as desired.

Any suitable anode material can be included in an alumina substrate supported SOFC. The most common material used in SOFCs is a cermet made up of nickel oxide mixed with the ceramic material that is used for the electrolyte in that particular cell. Typical ceramics can include, without limitation, YSZ (yttria stabilized zirconia), gadolinium-doped ceria (GDC or GCO; e.g., $Gd_{0.1}Ce_{0.9}O_{1.95}$), samarium-doped ceria (SDC; e.g., $Ce_{0.8}Sm_{0.2}O_{1.9}$), and so forth.

Some exemplary cathode materials include, without limitation, praseodymium-doped barium cobalts (PBC) such as praseodymium-doped barium cobalt oxide (e.g., $PrBaCo_2O_{5+\delta}$ (PBCO); wherein $\delta$ is the oxygen ion deficit); praseodymium-doped barium ferrites (e.g., $PrBaFe_2O_{5+\delta}$ (PBFO); a PBC or PBFO combined with the electrolyte ceramic, e.g., PBC-BCPY ($BaCe_{0.4}Pr_{0.4}Y_{0.2}O_{3-\delta}$) or PBC-BZCY ($BaZr_{0.1}Ce_{0.7}Y_{0.2}O_{3-\delta}$); lanthanum strontium cobalt ferrites (LSCF); LSCF combined with a secondary component such as $BaZr_{1-x-y-z}Ce_xY_yYb_zO_{3-\delta}$ (where x, y z are dopant levels and $0<x+y+z<1$) (BZCYYb), e.g., LSCF-BZCYYb; strontium doped lanthanum manganite (also known as lanthanum strontium manganite (LSM)) or a mixture of the electrolyte ceramic (e.g., SDC) and LSM.

Any suitable electrolyte material contained in any suitable electrolyte composition can be utilized, with the preferred characteristics of the electrolyte generally depending upon the procedure utilized to coat the electrolyte composition onto the adjacent electrode layer.

Electrolytes can include oxygen ion conducting electrolytes or proton conducting electrolytes, as desired. Oxygen ion conductors have been the conventional conductors for electrolyte use in solid oxide cells. However, proton conductors are also available for use. Proton-conducting electrolytes can have the advantages of high proton conductivity and low activation energy at intermediate temperatures, which may widen the selection of materials to be used in the solid oxide cells. Advantages of proton-conducting electrolytes include water being generated in the cathode side of the solid oxide cells, thus avoiding fuel dilution at the anode side.

The prevailing material for an oxygen ion type solid electrolyte is yttria-stabilized zirconia (YSZ) or a ceria-based composition. A ceria based composition can include $CeO_2$ and a metal dopant. The metal dopant in the ceria based composition can generally be at an amount equal to or more than about 10 wt. % and less than about 30 wt. % based on a total weight of the ceria based composition. The metal dopant can include, without limitation, samarium and gadolinium. Examples of doped ceria-based electrolyte materials can include $Ce_{0.8}Sm_{0.2}O_{1.9}$ (SDC) and $Ce_{0.9}Gd_{0.1}O_2$ (GDC). Other suitable electrolyte materials can include Y-doped $BaZrO_3$ (BYZ), Y-doped $BaCeO_3$ (BCY), yttrium- and ytterbium-doped barium-zirconate-cerate (BZCYYb), scandia doped BZCY (BZCYSc), scandia stabilized zirconia (ScSZ), and Strontium and Magnesium doped Lanthanum Gallate (LSGM).

The electrode and electrolyte solutions that are coated on the alumina support can also include binder, solvent, dispersant, pore forming component (electrode layers only) etc. as is known in the art in conjunction with the active material. Examples of typical components as may be incorporated in coating compositions include those as are described above with regard to the alumina substrate precursor composition. In addition, the electrode and electrolyte compositions can include the same binder, solvent, etc. as one another or may include different components, as desired.

The coating and sintering of the various layers can be carried out in any suitable fashion. For instance, in one embodiment, a binder composition, a first electrode precursor composition, and an electrolyte precursor composition can be applied to the alumina substrate support prior to sintering. As such, the coagulated precursor tube, the binder, the first electrode, and the electrolyte can all be sintered at the same time. While it is not a requirement that these layers all be sintered at the same time, it can be preferred to do so as this can be less expensive than separate sintering steps.

The second electrode composition (e.g., an electrode composition including a cathode material) can generally be applied to the electrolyte layer following sintering of the electrolyte. Upon sintering of the second electrode layer 20 (FIG. 2), the SOFC can include the porous alumina substrate support 12, the first electrode 16 and the second electrode 20 separated by an electrolyte 18, and optionally including a porous barrier layer at the surface 15 of the support 12.

Figure 5:
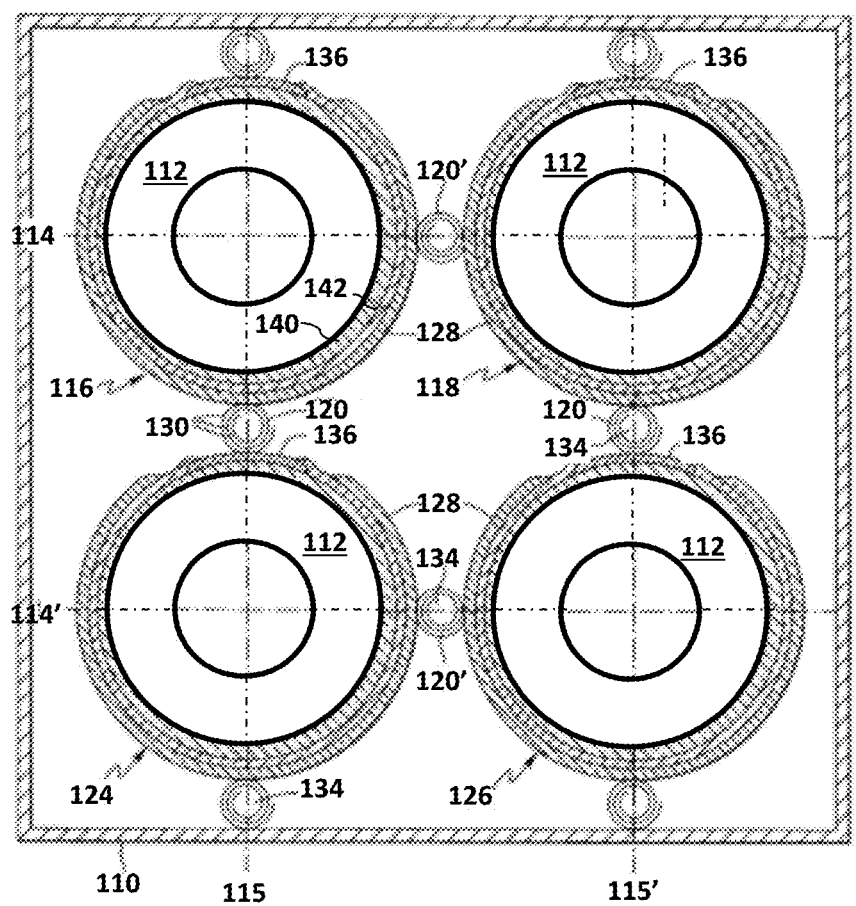
FIG. 5 is a cross sectional view of one embodiment of a fuel cell stack assembly.

In one embodiment, a plurality of alumina substrate supported SOFCs can be combined according to standard practice to form an array of solid oxide cells. By way of example, FIG. 5 illustrates a two by two cell array of tubular fuel cells in a plenum 110. The array comprises rows of fuel cells, such as, for example, a first row 114 including individual tubular fuel cells 116 and 118, which are electrically connected in parallel by hollow, rolled electrically conducting member (conductor) 120', Fuel cells 116 and 118 are also electrically connected in series (in columns 115 and 115') with the fuel cells in the adjacent second row 114', including fuel cells 124 and 126, by the conductor 120, which contacts their outer electrodes 128 and the interconnection layer 136. All of the fuel cells include inner alumina substrate supports 112.

The conducting members 120 and 120' can be a thin sheet of porous mesh, rolled on itself to form plural layers bonded at the end. Of course, a single roll could be used if of an appropriate thickness and any other means suitable to hold the shape of the rolled mesh can be substituted. The conductors 120 and 120' are shown loosely rolled (for illustrative purposes), but will be tightly coiled in actual use, so that all the layers intimately contact each other. Also shown is the hollow, axially elongated, unfilled volume 134 between the interconnect material 136 and the outer electrodes 128.

All of the fuel cells include an inner alumina substrate support 112, an inner electrode layer 140 (e.g., an anode), a solid electrolyte layer 142, an outer electrode layer 128 and an outer interconnection layer 136, which physically and electrically contacts the outer electrode, as shown in FIG. 5. All of the interconnections 136 of the second row 114' of cells face all of the outer electrodes 128 of the first row 114 of cells. Thus, the interconnection of cell 124 will face the outer electrode of cell 116 within the column 115 of cells.

The present disclosure may be better understood with reference to the Examples set forth below.

EXAMPLE

An in-house built extrusion system in combination with modified phase-inversion method as schematically illustrated in FIG. 3 was used to fabricate micro-tubular alumina substrate with radially well-aligned micro-channel array. To form the alumina slurry, polyethersulfone (PESf) (Ver-adel 3000P, Solvay Specialty Polymers, USA) and polyvinylpyrrolidone (PVP) (K30, CP, Sinopharm Chemical Reagent Co., China) were dissolved in N-methyl-2-pyrrolidone (NMP) (HPLC grade, Sigma-Aldrich, USA) and ball-milled for 2 hours. Commercial α-$Al_2O_3$ powders (ultra-pure grade, average particle size 0.75 μm, Inframat Advanced Materials, USA) and 10 wt. % of NiO (Fine grade, FCM, USA) as sintering aid were added into the organic mixture and subsequently ball-milled for 48 hours to form a homogeneous spinning slurry. The details of the slurry composition are provided in Table 1.

TABLE 1

| Component | Wt. % |
|---|---|
| NMP | 33.6 |
| PESf | 5.6 |
| PVP | 0.8 |
| $Al_2O_3$ | 54.0 |
| Ni | 6.0 |

The as-prepared slurry was degassed for 10 min and then loaded into the chamber of a stainless steel mold. A double orifice spinneret with outer diameter of 2.6 mm and inner diameter of 1.6 mm was attached at the bottom of the chamber. A mixture of NMP (95 vol. %) and tap water (5 vol. %) was used as the internal coagulant and fed through the central channel of the spinneret. The flow rates of the slurry and internal coagulant were driven and controlled by flow meters (Seven Star, China) in combination with an in-house built pressurized nitrogen gas system. Tap water was used as external coagulant. The air gap between the tip of spinneret orifice and the surface of water bath was close to zero. The extruded micro-tubular green bodies were left in water bath for 24 h, allowing for the completion of the exchange and solidification process. Detailed extrusion parameters are listed in Table 2.

TABLE 2

| Parameter | Value |
|---|---|
| Air gap (mm) | 0 |
| Room Temperature (° C.) | 20.0 |
| $N_2$ pressure for inner coagulant (bar) | 0.5 |
| Inner coagulant flow rate | 5.0 |

The green bodies were dried at room temperature in air and cut into different sizes as green substrate. The green substrates were fired at 800° C. for 2 h in air to remove the organic components, and subsequently sintered at 1200° C. for another 2 h in air to achieve sufficient mechanical strength for subsequent coating of functional layers.

Thin layers of anode and electrolyte were successively applied onto the pre-sintered micro-tubular alumina substrate by dip-coating and sintering process alternatively. Prior to coating the NiO-SDC anode layer, a porous SDC barrier layer was first applied onto the alumina tube.

For the preparation of the composition for the porous SDC barrier layer, 5 wt. % SDC (Tape cast grade, FCM, USA) and 5 wt. % graphite powder (MCMB, MTI Corporation, USA) as pore former with dispersant, plasticizers, binder and solvent (compositions listed in Table 3) were mixed together and ball-milled for 7 days before use. The anode and electrolyte compositions (Table 3) were prepared using the same procedure.

TABLE 3

| | Wt. percentage | | |
|---|---|---|---|
| Component | Barrier layer | Anode | Electrolyte |
| SDC | 5.0 | 3.0 | 10.0 |
| NiO | — | 7.0 | — |
| Graphite | 5.0 | — | — |
| Triethanolamine | 1.0 | 4.0 | 1.0 |
| Di-n-butyl phthalate | 0.5 | 2.0 | 0.5 |
| Polyethylene glycol (MW 300) | 0.5 | 2.0 | 0.5 |
| Polyvinyl butyral | 0.5 | 2.0 | 0.5 |
| Ethanol | 87.5 | 80.0 | 87.5 |

Pre-sintered alumina substrate was sealed at both ends using PTFE films and vertically immersed into the binder composition for 5 minutes then dried in air at room temperature. The coating procedure was repeated 10 times. After drying the final coating, the anode composition was dip-coated onto the barrier layer using the same procedure. The layers were then co-fired at 1000° C. for 2 h. The assembly of substrate/SDC buffer layer/anode functional layer was subsequently coated with SDC electrolyte solution 10 times with each coating time being 5 min, then dried at room temperature. Sintering was then carried out at 1450° C. for 5 h in air to densify SDC electrolyte and obtain half cells. All the heating and cooling rates were fixed at 3° C./min.

To form the cathode, $PrBaCo_2O_{5+\delta}$ (PBC) cathode powders were synthesized using Pechini process as known. The synthesized fine PBC powders (40.0 wt %) were ground with ethyl-cellulose and α-terpineol (6.0 wt. %: 54.0 wt %, Alfa Aesar, USA) to form a cathode ink that was brush-painted onto the SDC electrolyte, followed by firing at 1100° C. in air for 3 h to form a finished cell. The micro-tubular cells were 25 mm in length and 2.0 mm in outer diameter. The active cathode length was 4 mm and the area was about 0.25 $cm^2$.

Characterizations and Measurements

The microstructure of the prepared micro-tubular substrates and single cells were characterized using scanning electron microscopy (SEM, Zeiss Ultra Plus FESEM, Germany) at a voltage of 15 kV. Energy-dispersive X-ray spectroscopy (EDS) was carried out for compositional analysis using an Oxford Instruments detector.

The chemical reaction between alumina and nickel oxide was studied by crystal structure evolution characterized by X-ray powder diffraction (XRD) with Cu-Kα radiation (D/MAX-3C). The obtained XRD patterns were indexed and compared with an ICCD database (International Centre for Diffraction Data). For sample preparation, the green bodies of micro-tubular substrates were fired at 600, 800, 1000, 1200, 1400° C. in air for 5 h, respectively, and then ground into powders. The substrates were also fired at 1450° C. in air for 5 h and then reduced at 700, 800, 900° C. for 10 h in humidified hydrogen (approximately 3 vol. % $H_2O$, 30 mL/min), which were ground into powders.

The redox stability of the $NiAl_2O_4$ spinel phase formed by NiO and α-$Al_2O_3$ at high temperature sintering stage (1450° C. for 5 h in air) was examined at 800° C. in a cycling atmosphere, where a reducing (humidified hydrogen) and oxidizing (air) atmosphere were changed alternatively with nitrogen as a purging gas in between. Both the reducing period and oxidizing period were 1 h, and nitrogen purging time was 10 min. The XRD pattern of the substrate after three redox cycling treatment was obtained and compared with that before the redox treatment.

Linear shrinkage of as-prepared micro-tubular green alumina substrate was analyzed by a dilatometer (DIL 402 C, Netzsch). A sample with a length of 10 mm was heated up from room temperature to 1500° C. at a heating rate of 5° C. min$^{-1}$, the shrinkage along the longitudinal direction was measured with increasing temperatures.

The mechanical strength of the substrate sintered at different temperatures was determined using the three-point bending test with a 30 mm span and a crosshead speed of 0.2 mm/min. The measurements were performed at least five times using the samples sintered at the same temperature. The bending strength was then calculated by Equation 1:

$$\sigma_F = 8F \cdot L \cdot D / (D^4 - d^4)$$

where $\sigma_F$ is the bending strength,
F the fractural force applied on the sample,
L the span length,
D is the outer diameter of the micro-tubular sample, and
d is the inner diameter of the micro-tubular sample.

The gas permeability of the alumina substrate was measured using an in-house built permeation system. The alumina green body was sintered at 1450° C. in air for 5 h before gas permeation measurement.

The electrochemical performance of the fabricated single cells was tested from 500 to 600° C. with humidified hydrogen (approximately 3 vol. % $H_2O$, 30 mL/min) as the fuel and the ambient air as the oxidant. Silver paste was painted onto the surface of cathode and either end of the anode to achieve higher current collecting efficiency. Silver wire was wound around the cathode and at either end of the anode substrate to serve as the current collector. The anode was reduced at 600° C. for 5 h under the condition of humidified hydrogen before the testing. The voltage-current (V-I) and electrochemical impedance spectra (EIS) were measured using a Solartron 1260/1287 electrochemical workstation. The EIS measurements were performed with a voltage perturbation of 10 mV over the frequency range from $10^{-1}$ Hz to $10^5$ Hz.

In order to study the effect of 10 wt. % NiO sintering aid on the fabrication of single cells, a pure $Al_2O_3$ substrate with the same configuration was prepared and characterized. Pure $Al_2O_3$ supported half-cells with and without porous SDC barrier layer were also prepared, EDS line-scanning and full mapping for Al, Ce, Ni elements were used to demonstrate the role of SDC barrier layer.

Results

Figure 6:
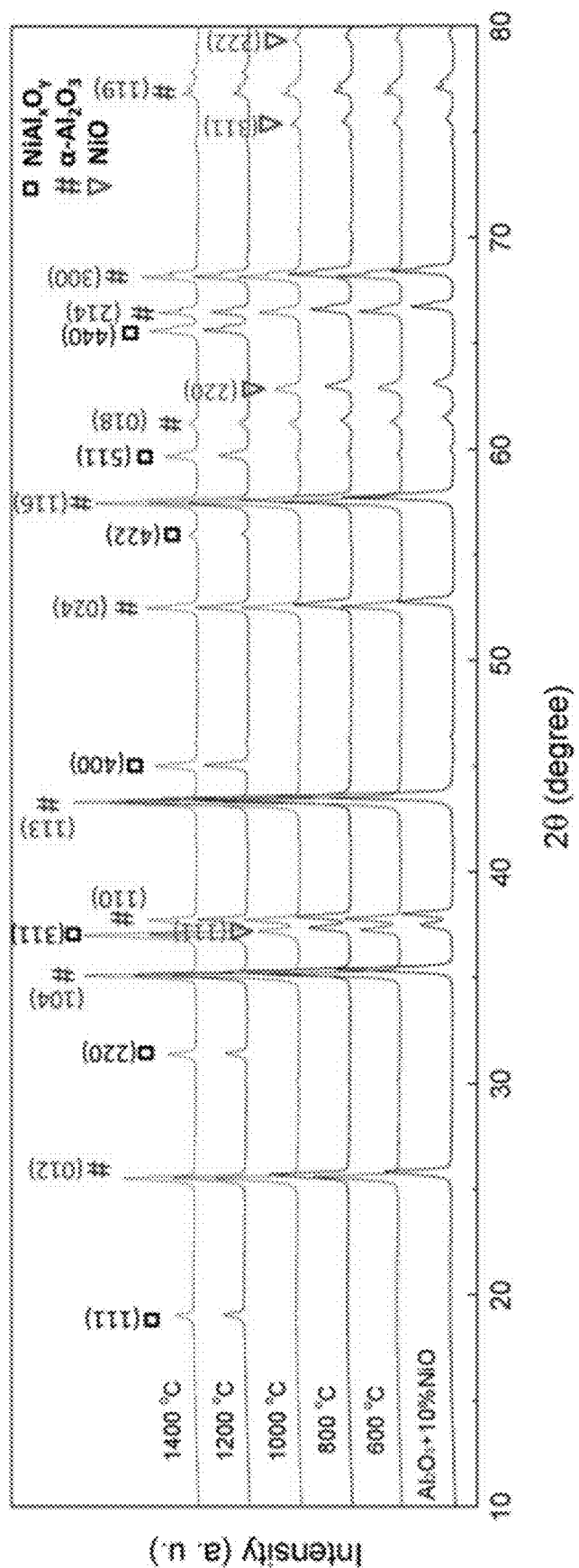
FIG. 6 presents the X-ray diffraction (XRD) patterns of alumina (10 wt. % NiO) substrates fired at various temperatures.

The XRD patterns of heat-treated substrates at different temperatures are shown in FIG. 6. When the heat-treatment temperature was 1000° C. and below, the XRD patterns were identical to those of NiO and α-$Al_2O_3$ mixture, indicating that no chemical reactions occurred. The XRD peaks corresponding to the (111), (220), (311), and (222) planes of NiO can be clearly identified. Once the heat-treatment temperature reached 1200° C. and above, the peaks corresponding to NiO disappeared, and new peaks corresponding to $NiAl_2O_4$ spinel structure appeared. These observations clearly indicate that $NiAl_xO_y$ spinel composites were formed from the chemical reactions between alumina and nickel oxide at the temperature of 1200° C. and above.

Figure 7:
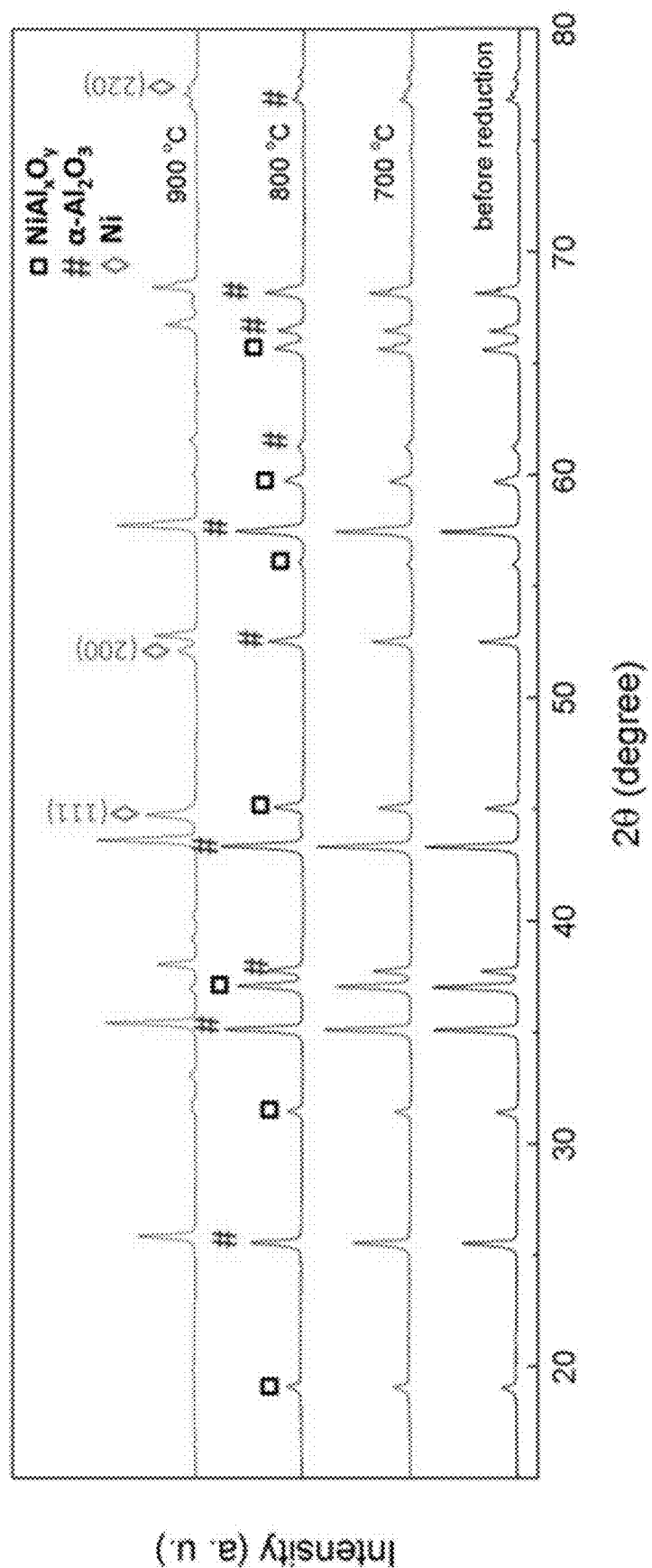
FIG. 7 presents the XRD patterns of alumina (10 wt. % NiO) substrates after reducing at various temperatures.

Under the operating conditions of single cells, the substrates were subject to reducing atmosphere at elevated temperatures. The $NiAl_2O_4$ spinel phase formed at high temperature sintering could be decomposed into Ni and α-$Al_2O_3$. This in turn would affect structural reliability of the substrate and single cells. Therefore, the substrates sintered at 1400° C. were treated in a reducing atmosphere of humidified hydrogen at different temperatures. The XRD patterns of treated substrates were obtained and shown in FIG. 7. As one can see, the XRD patterns of the substrates treated at 800° C. and below are identical to those of the substrate before the treatment. However, after treatment at 900° C., the XRD peaks corresponding to nickel can be found, indicating that $NiAl_2O_4$ spinel phase was decomposed into Ni and α-$Al_2O_3$. These results further indicate that the substrates sintered at high temperature of 1400° C. were chemically stable when treated in a reducing atmosphere at the temperature of 800° C. and below, which implies that the substrate was redox stable under SOFC operating conditions at intermediate temperatures.

Figure 8:
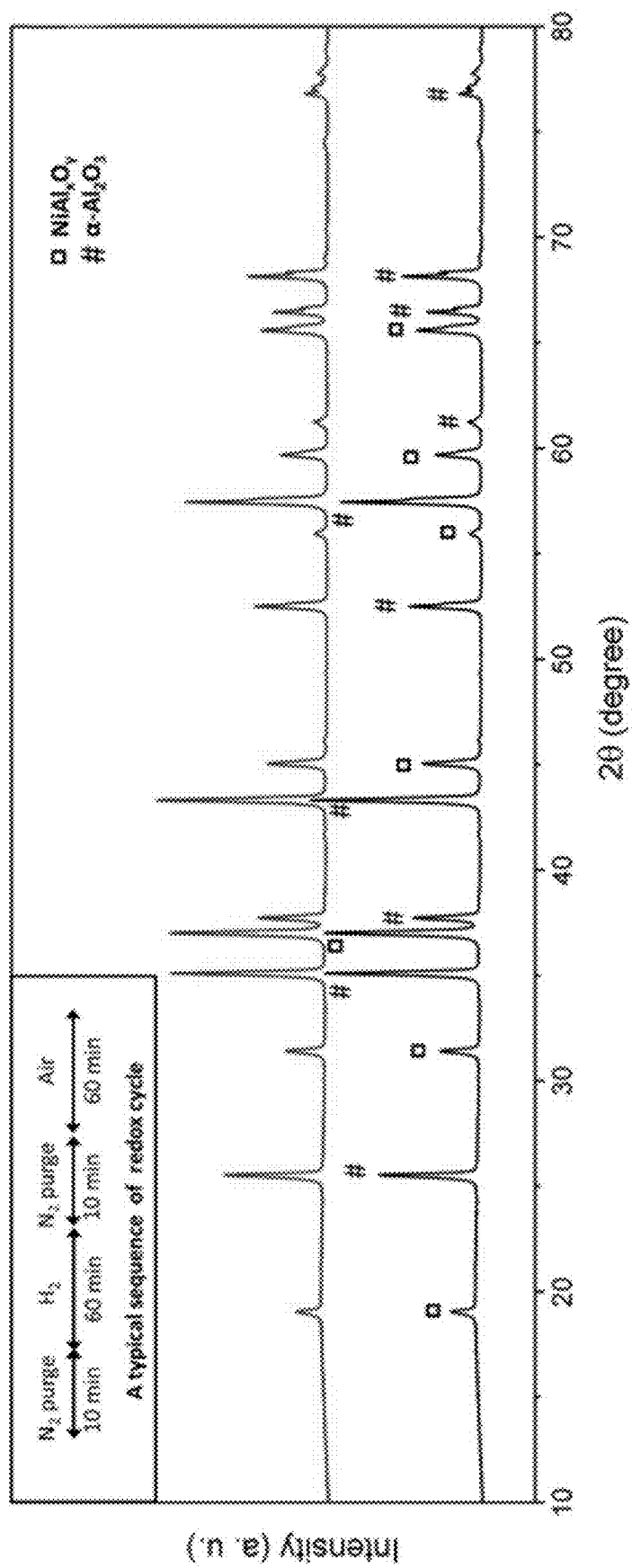
FIG. 8 presents XRD patterns of a sintered alumina substrate (10 wt. % NiO) before (lower trace) and after (upper trace) three redox cycling treatment at 800° C. Insert: typical sequence of redox cycle.

The XRD patterns of the sintered alumina substrate before and after three redox cycling treatment at 800° C. are shown in FIG. 8. Clearly no peaks corresponding to other phases (e.g., Ni, NiO) appeared after the treatment, indicating the excellent redox stability of $NiAl_2O_4$ spinel phase and alumina substrate (with 10 wt. % NiO).

Figure 9:
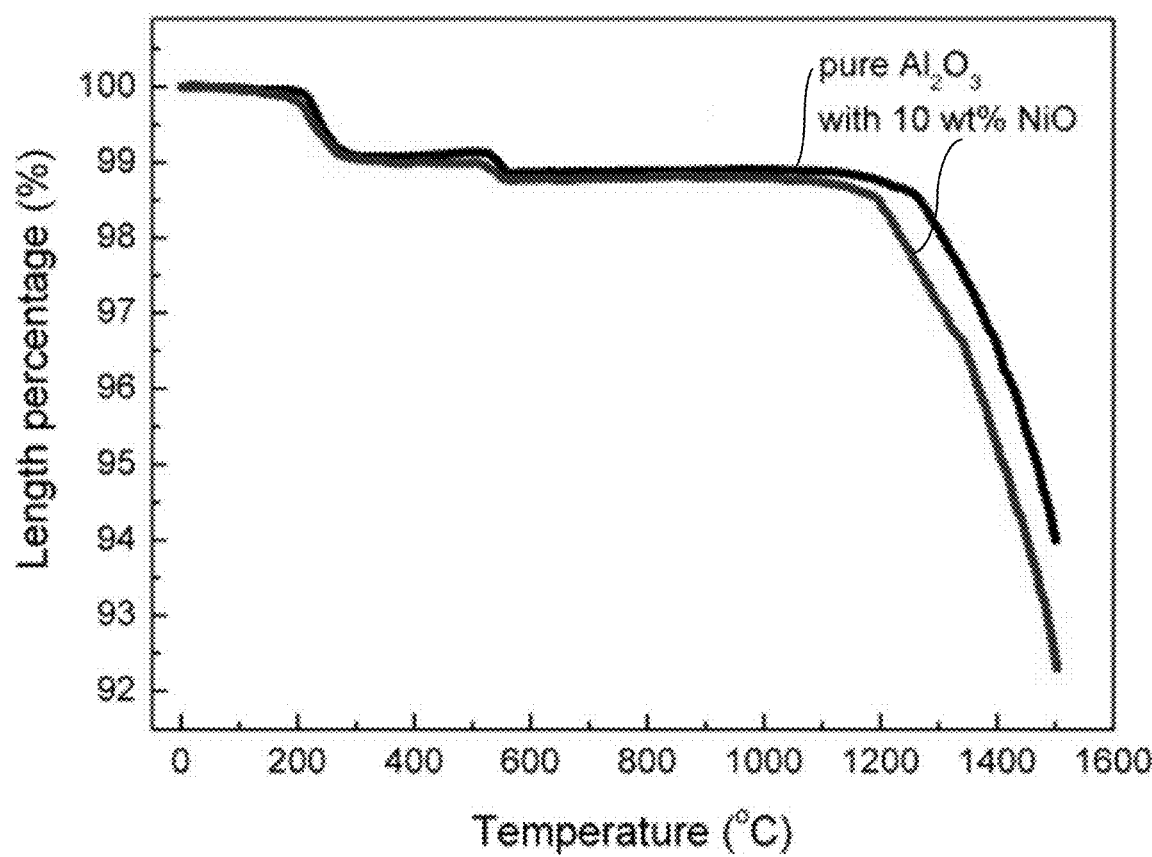
FIG. 9 illustrates the linear shrinkage of substrate precursors upon a heating rate of 5° C./min in air.

FIG. 9 shows the longitudinal shrinkage history of the substrate precursors when the temperature increased from room temperature to 1500° C. at a constant heating up rate of 5° C. min$^{-1}$. For the alumina substrate, a linear shrinkage of around 1% occurred in the temperature range of 200-300° C., corresponding to the viscous deformation of the polymers contained in the substrate precursor. A small, but noticeable shrinkage appeared at the temperature of about 500° C., which was attributed to the burning-out of the polymers. Large shrinkage appeared at temperatures above 1200° C., which was related to the bonding and necking of alumina particles. A total linear shrinkage of 6% was obtained when the pure alumina substrate sample was heated up to the temperature of 1500° C. When the sintering aid of NiO (10 wt %) was added, the substrate precursor demonstrated similar shrinkage behavior to the substrate without NiO below the temperature of about 1100° C. Above 1100° C., significant shrinkage was observed. The total longitudinal shrinkage of the micro-tubular substrate precursor reached 8% at 1500° C.

Figure 10:
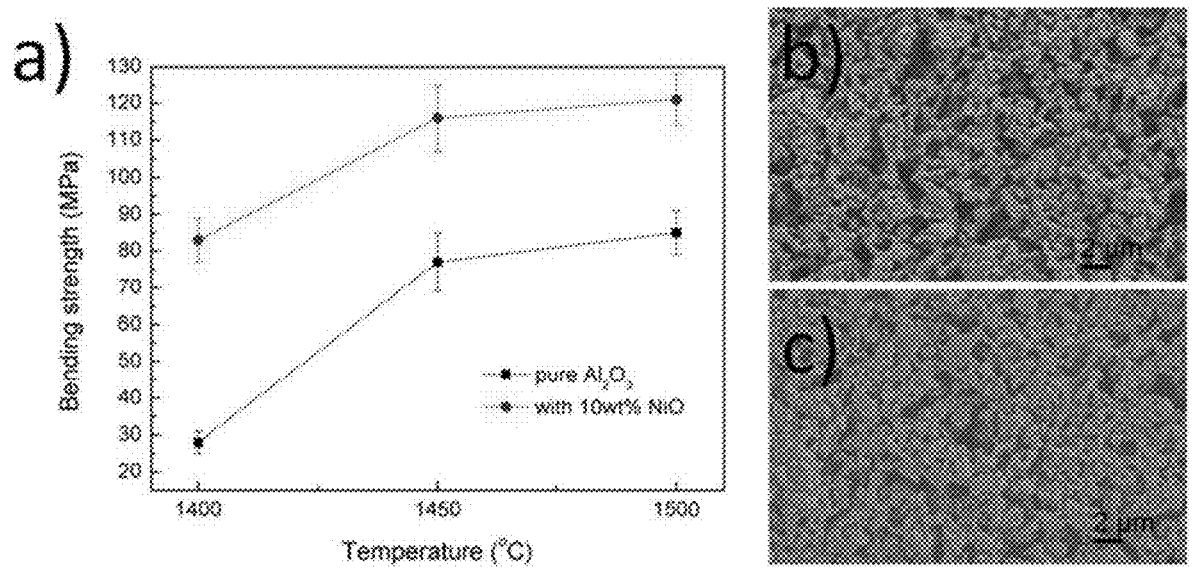
FIG. 10 at a) presents the bending strength of substrates sintered at different temperatures for 5 h; SEM images of bulk substrate are shown after sintering at 1450° C. for 5 h including substrate materials of pure alumina at b) and of alumina mixed with 10 wt. % NiO at c).

FIG. 10 at a) shows the three-point bending strengths of the micro-tubular substrate precursors with/without addition of 10 wt. % NiO after sintered at temperatures of 1400, 1450, and 1500° C. respectively. Obviously, the strength showed a significant increase when the sintering temperature was increased from 1400 to 1450° C. A slight increase of bending strength was observed when further increasing the sintering temperature from 1450 to 1500° C. It was also obvious that the bending strength of the substrates were significantly improved when 10 wt. % NiO sintering aid was added into the substrate precursors. The bending strength of about 125 MPa was obtained for the NiO—$Al_2O_3$ substrate after sintering at 1450° C. for 5 h, approximately 1.5 times that of the substrate without NiO sintering aid. As mentioned above, chemical reaction of $Al_2O_3$ and NiO took place when the sintering temperature increased above 1100° C., resulting in $NiAl_2O_4$ phase. The formation of $NiAl_2O_4$ phase in turn led to the agglomeration of the involved particles, which improved the bending strength of the substrate. In fact, the SEM image of the sintered pure $Al_2O_3$ substrate only showed inter-particle necking and bonding (FIG. 10 at b). Once 10 wt. % NiO sintering aid was employed, particle agglomerations were clearly observed, which led to the distributed small bulky areas in the SEM image of FIG. 10 at c).

Figure 11:
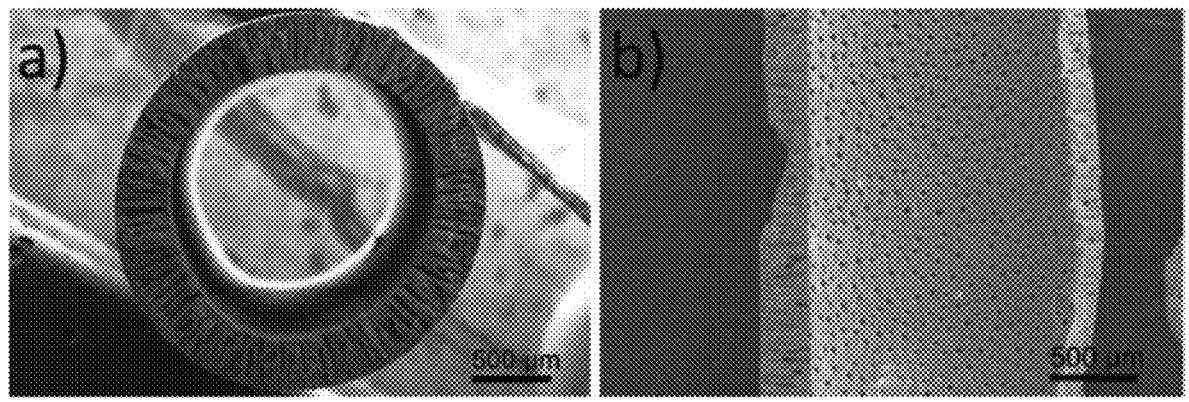
FIG. 11 presents SEM images of an alumina substrate (10 wt. % NiO) sintered at 1450° C. for 5 h in cross-section at a) and along the inner surface at b).

FIG. 11 shows SEM images of the cross section (a) and inner surface (b) of a substrate after sintered at 1450° C. in air for 5 h. As can be seen, micro-channels with diameters of approximately 20 to 30 μm were formed in the substrate and well-aligned radially (FIG. 11 at a). The micro-channels were open at the inner surface of micro-tubular substrate (FIG. 11 at b).

Figure 12:
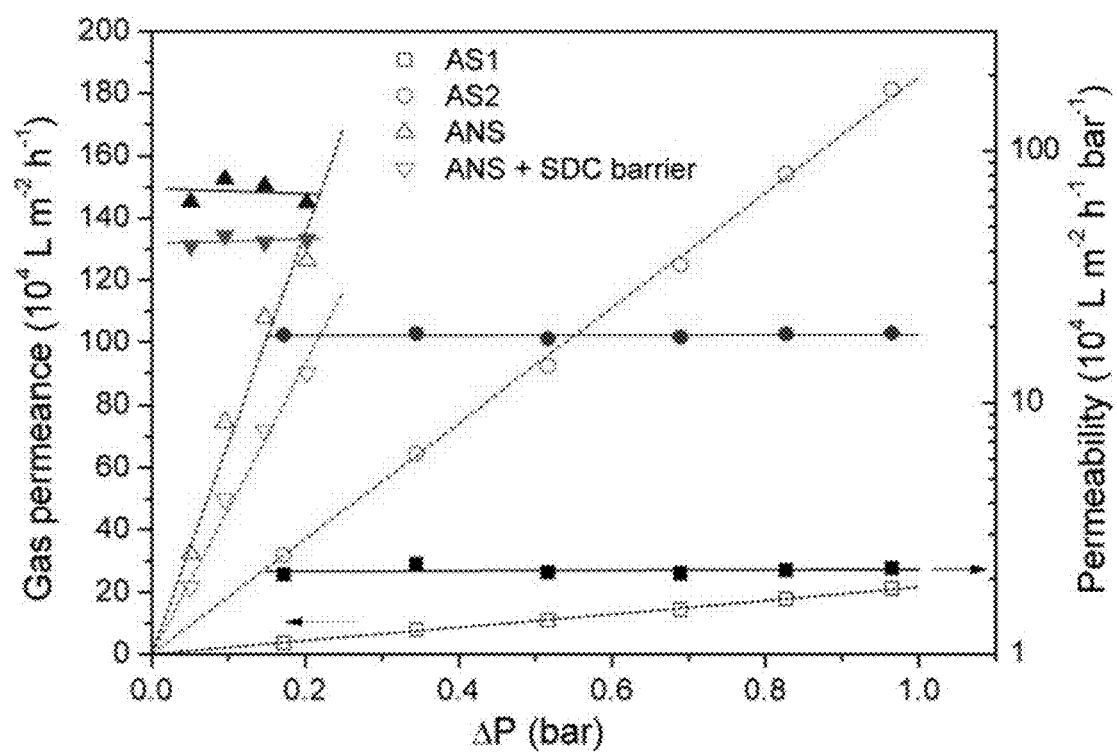
FIG. 12 compares gas permeability of micro-tubular substrates formed of different materials and having different microstructures. AS1: Ni-SDC substrate with a conventional microstructure, AS2: Ni-SDC substrate with a microstructure as disclosed herein, ANS: alumina (10 wt. % NiO) substrate with microstructure as disclosed herein.
Figure 14:
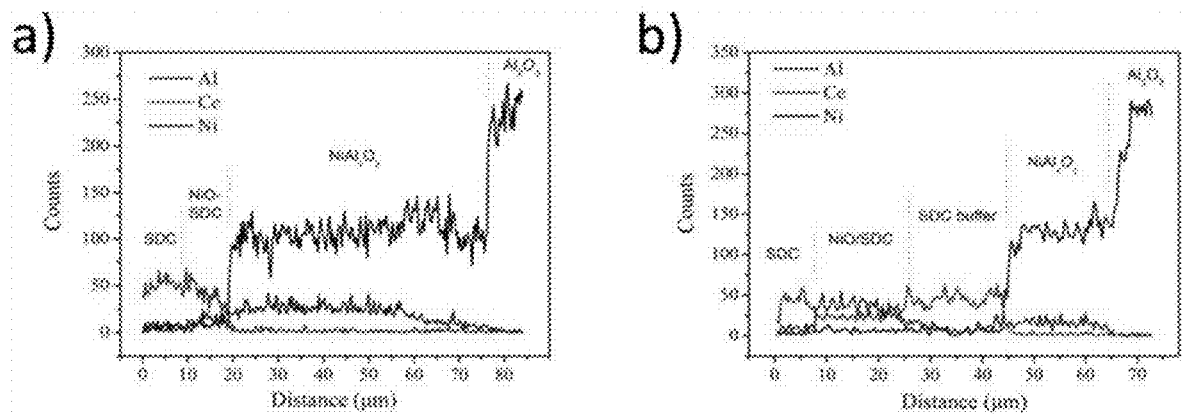
FIG. 14 illustrates the intensity line scan EDS for Al, Ce and Ni signals measured radially from the surface of SDC electrolyte to the alumina substrate for the pure alumina supported NiO-SDC/SDC half-cells without an SDC barrier layer at a), and with a SDC porous barrier layer between the substrate and anode at b).

As discussed above and schematically illustrated in FIG. 4, through use of a solvent/anti-solvent solution including a relatively high concentration of solvent as the internal coagulant, the cross sectional microstructural features of the microtubular substrates were highly aligned and spanned the width of the alumina substrate. Experimental measurements verified that the $N_2$ permeability of the substrates were nearly 10 times that of a conventional structure formed with water as both internal and external coagulant. Conventional structures are marked as AS1 and AS2 in FIG. 12 respectively. The alumina micro-tubular substrate with the microstructure shown in FIG. 11 demonstrated a permeability as high as $69.2 \times 10_5$ $Lm^{-2}h^{-1}$ as marked by ANS in FIG. 12, which is 3 times that of Ni-SDC micro-tubular substrate with similar microstructures. When a porous SDC barrier layer was applied to the alumina micro-tubular substrate, the corresponding gas permeability was slightly reduced (FIG. 12), but still much better than that of a traditional Ni-SDC substrate. The micro-tubular substrates with different materials and microstructures and the corresponding gas permeability are summarized in Table 4. In the table, the conventional structure includes the sponge layer due to extrusion with pure water on both sides of the extrudate.

further confirmed that the NiO in the anode layer diffused into the top part of porous alumina substrate, which could form $NiAl_xO_y$ phase. The line EDS analysis along the radial direction shown in FIG. 14 at a) further verified the above observations, where a significant amount of NiO in NiO-SDC anode layer diffused into the alumina substrate, forming a $NiAl_xO_y$ phase region from 20 µm to 75 µm measured radially from the outer surface of the half-cell.

Figure 13:
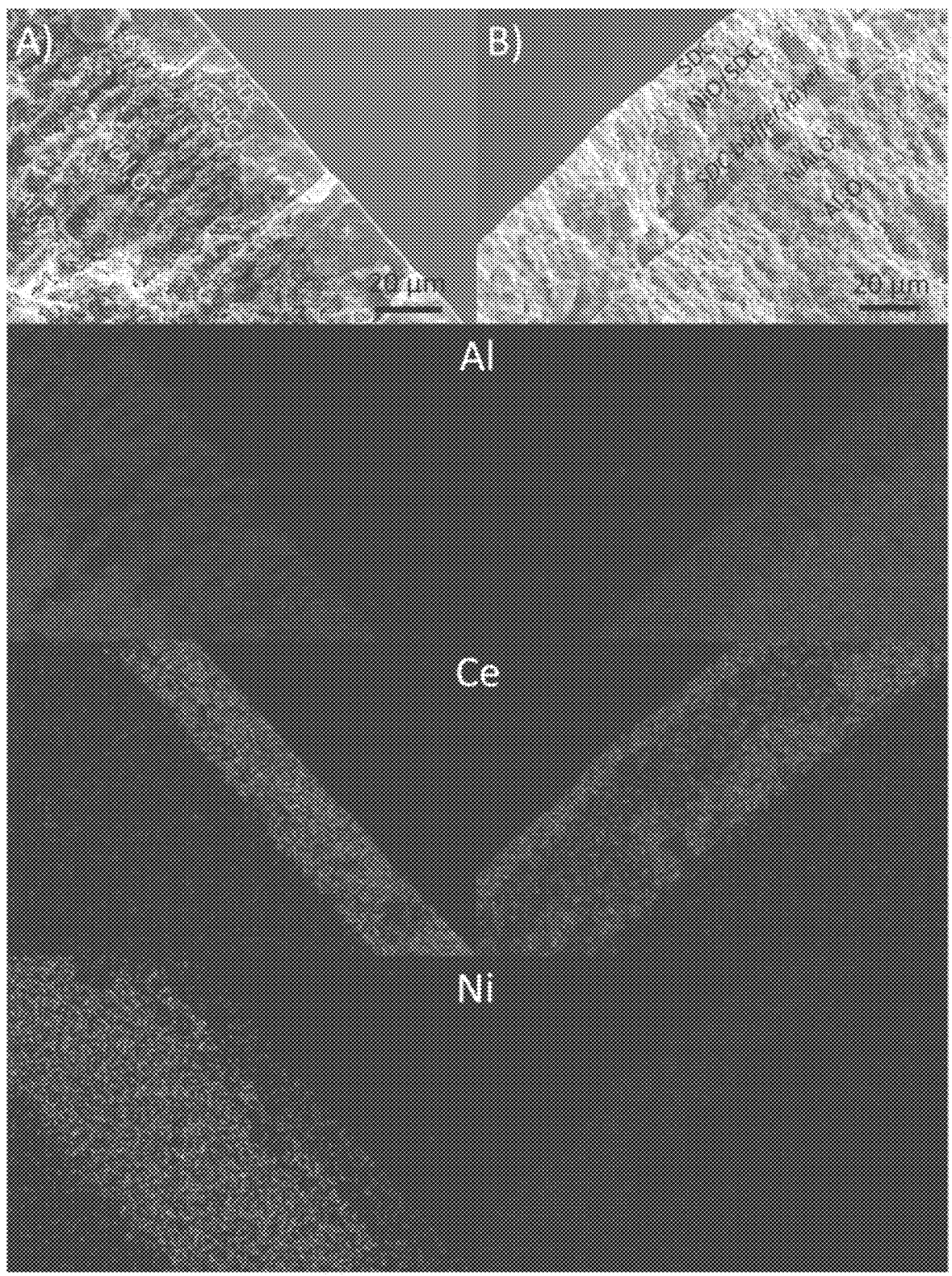
FIG. 13 illustrates cross-sectional SEM images of pure alumina supported NiO-SDC/SDC half-cells without an SDC barrier layer in column A), and with a SDC porous barrier layer between the substrate and anode in column B).

To overcome NiO diffusion, a porous SDC barrier layer was embedded between the substrate and NiO-SDC anode layer. FIG. 13 in column B shows the cross-sectional image of the half-cell fabricated with this SDC barrier layer strategy. During the high temperature sintering process, the NiO in NiO-SDC layer inevitably diffused toward $Al_2O_3$ porous substrate. However, the porous SDC barrier layer significantly inhibited NiO from diffusing into the alumina substrate. This can be seen from the line EDS analysis in FIG. 14 at b), where only a little amount of NiO diffused into the alumina substrate with the thickness of about 20 µm, much narrower than that without SDC barrier layer. It was also obvious that a significant amount of NiO was retained in the anode layer after high temperature sintering. To compensate for the NiO loss in the anode layer, a relatively high weight ratio of NiO:SDC=7:3 was employed for anode slurry preparation for anode layer dip-coating.

TABLE 4

| | Substrate | Thickness (µm) | Structure | Permeability ($\times 10_5$ $Lm^{-2}$ $h^{-1}$) |
|---|---|---|---|---|
| AS1 | Ni-SDC | 120 | Conventional | 2.1 |
| AS2 | Ni-SDC | 120 | As described | 18.3 |
| ANS | $Al_2O_3$—NiO | 300 | As described | 69.2 |
| ANS + barrier | $Al_2O_3$—NiO/SDC | 300/20 | As described | 45.4 |
| Literature 1* | Ni-YSZ | 300 | Conventional | 6.85 |
| Literature 2** | NI-GDC | 300 | As described | 2.45 |

*Acs Appl Mater Inter, 6, 18853 (2014).
**J Membrane Sci, 360, 410 (2010).

Figure 15:
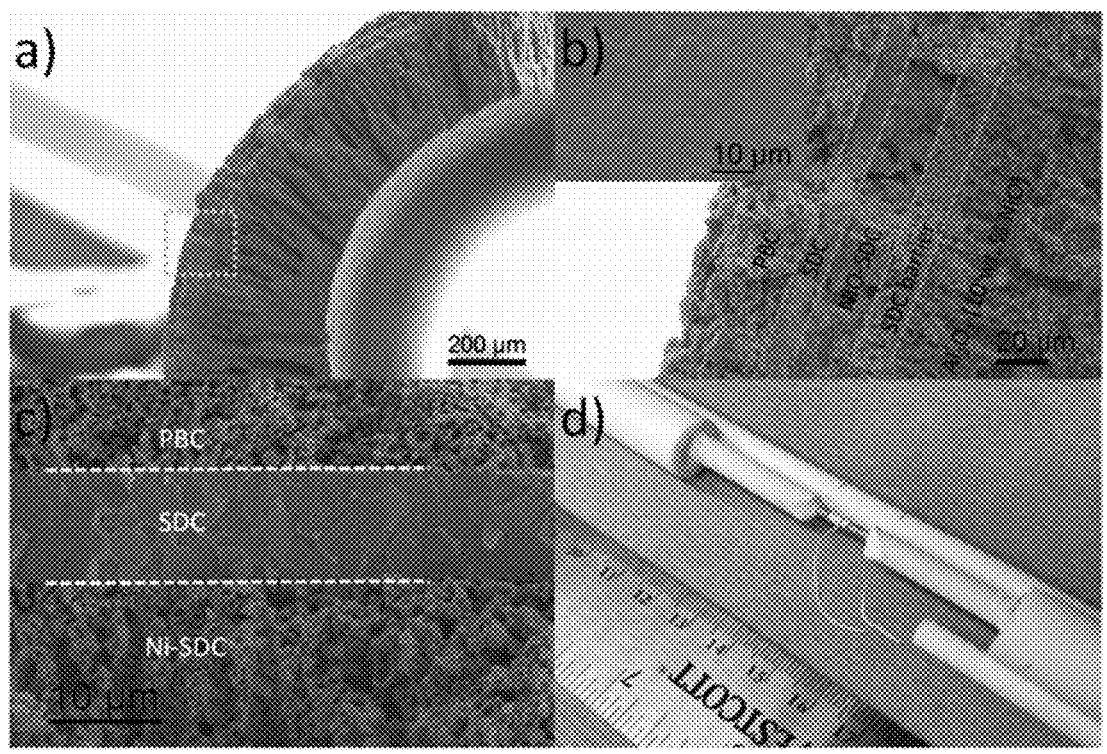
FIG. 15 illustrates a cross-sectional SEM image of alumina (10 wt % NiO) substrate supported micro-tubular cell with configuration of alumina substrate/SDC barrier layer/NiO-SDC/SDC/PBC at a); a partially enlarged image of the marked area in a) at b) (the insert at b) is the surface image of the SDC electrolyte of a half cell sintered at 1450° C. for 5 h. At c) is illustrated the microstructure near the electrolyte/electrode interfaces after the anode reduction at 600° C. for 5 h in humidified $H_2$. A photograph of a single cell test stand assembly is shown at d).

With the prepared alumina micro-tubular substrate, thin layers of NiO-SDC anode and SDC electrolyte were successively dip-coated onto the pre-sintered alumina substrate. After co-sintering at the temperature of 1450° C., the electrolyte was densified while the three layers of substrate/NiO-SDC anode/SDC electrolyte were bonded together, forming a micro-tubular half-cell. Since NiO (10 wt. %) was contained in the $Al_2O_3$ substrate, it was not easy to clearly characterize the diffused NiO in the substrate with EDS technique. As such, for a clear and convenient comparison, a pure alumina substrate was employed for half-cell fabrication and analysis to demonstrate the concept of NiO diffusion buffer layer. FIG. 13 in column A shows the cross-sectional SEM image of the half-cell. A dense SDC layer can be clearly observed on the top surface. The EDS analysis in the lower panels of column A showed that the elements Al and Ce as well as Ni were confined in certain regions. In an ideal situation, the region occupied by Ni should be only part of the region occupied by Ce element, due to the fact that Ce is in both the anode (NiO-SDC) and electrolyte (SDC) layers. Interestingly, the Ni region was much wider than the Ce region, indicating that NiO in the anode layer diffused into the porous alumina substrate during high temperature sintering process. In fact, the EDS analysis of Al element distribution clearly showed two regions: a top slightly dark region with the thickness of about 55 µm and a bottom brighter region. This observation Using the porous SDC barrier layer strategy, micro-tubular cells were built upon alumina substrates with 10 wt. % NiO addition. FIG. 15 at a) shows the cross-sectional SEM image of an alumina substrate (10 wt. % NiO addition) supported micro-tubular cell with the configuration of alumina substrate/SDC barrier/NiO-SDC/SDC/PBC. The thickness of the alumina substrate was about 300 µm. After several steps of high temperature sintering, the radially aligned micro-channels were well retained, indicating their excellent thermal stability. The SDC barrier layer and NiO-SDC layer with the thickness of about 15 µm and about 20 µm respectively can be observed from FIG. 15 at b). The dense SDC electrolyte with the thickness about 10 µm was obtained, which can be seen from both the cross-sectional image and the surface SEM image of the insert figure. The SDC barrier layer was well contacted with both the substrate and anode layer (FIG. 15 at b). Both anode layer and cathode layer showed intimate contact with the electrolyte layer (FIG. 15 at c). FIG. 15 shows at d) an image of a test stand assembly that was used for electrochemical performance measurements, where ceramic paste was used to seal and attach either end of a cell onto the test alumina stand. The anode was reduced at 600° C. for 5 h in the humidified hydrogen before the test. The anode layer with more porosity was obtained due to the reduction of NiO to Ni. No delamination was observed near the electrode/electrolyte interface after the reduction (FIG. 15 at c).

Figure 16:
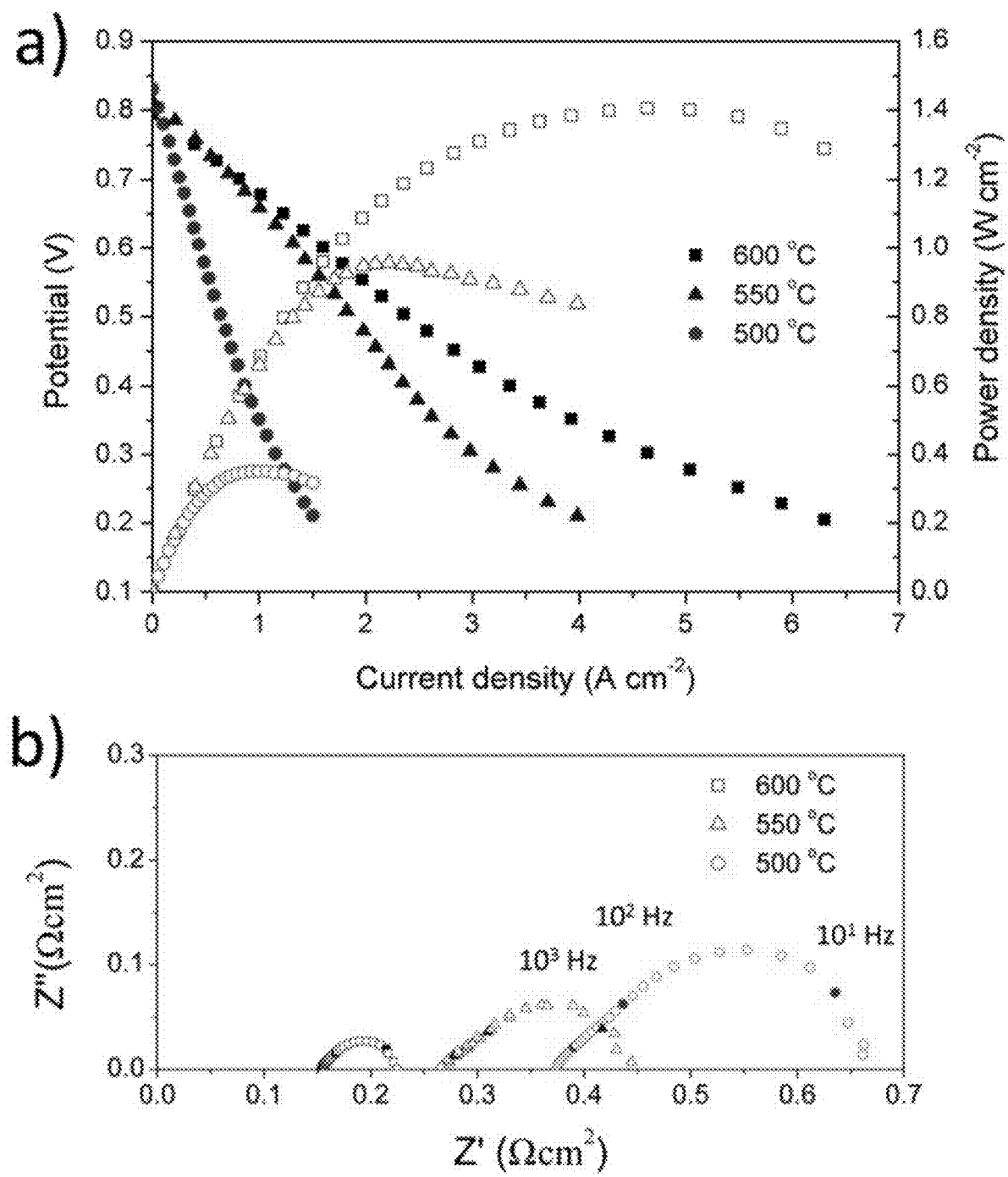
FIG. 16 illustrates the electrochemical performance of an alumina substrate supported micro-tubular SOFC at various temperatures. At a) is provided P-V-I curves and at b) is provided EIS curves at open circuit voltage condition.

An alumina substrate (10 wt. % NiO addition) supported micro-tubular cell with the configuration of substrate/SDC barrier layer/NiO-SDC/SDC/PBC was electrochemically tested from 500 to 600° C. with humidified hydrogen as the fuel and ambient air as the oxidant. FIG. 16 shows electrochemical performance of the cell. The open circuit voltages (OCVs) of 0.84 V-0.81 V were obtained at operating temperature of 500-600° C., which were comparable to those of cells in the literature with SDC electrolyte. A slight decrease of OCVs with increasing operating temperatures was attributed to the improved electronic current leakage through the SDC electrolyte. The slope of V-I curves decreased with increasing current densities, especially at relatively high current densities. This indicated that the overall polarization resistance decreased with increasing the current density, partially because of high gas permeability of micro-channel structured alumina substrate. The cell demonstrated a peak power density of 1420 mW cm$^{-2}$, 915 mW cm$^{-2}$ and 382 mW cm$^{-2}$ at 600, 550 and 500° C., respectively. The electrochemical impedance spectra (EIS) under OCV conditions displayed in FIG. 16 at b) indicated that the cell total resistance (Rt) decreased from 0.66 to 0.22 Ω cm$^2$ and overall polarization resistance ($R_p$) from 0.29 to 0.07 Ω cm$^2$ upon increasing the temperature from 500 to 600° C.

Table 5 summarizes the peak power densities of Ni-SDC/SDC/PBC cells with different configuration designs. The micro-tubular designs demonstrated very high performance at relatively low temperature. In particular, the anode-supported micro-tubular cell Ni-SDC/SDC/PBC showed the peak power density of 1484 mW cm$^{-2}$ at 600° C. The micro-tubular alumina substrate supported cell alumina/Ni-SDC/SDC/PBC demonstrated a peak power density of 1420 mW cm$^{-2}$ at 600° C.

TABLE 5

| Configuration | Support type | Performance (mW cm$^2$) | Cell description |
| --- | --- | --- | --- |
| Ni-SDC/SDC/PBC | Anode | 866 @ 650° C. | J Power Sources, 185, 193 (2008) |
| Ni-SDC/SDC/PBC | Electrolyte | 620 @ 600° C. | J Power Sources, 188, 96 (2009) |
| Ni-SDC/SDC/PBC-PBC | Anode | 1150 @ 650° C. | J Power Sources, 195, 7187 (2010). |
| Ni-SDC/SDC/PBC | Anode | 750 @ 650° C. | J Power Sources, 203, 34 (2012). |
| Ni-SDC/SDC/PBC | Anode | 1045 @ 700° C. | Electrochim Acta, 55, 3812 (2010). |
| Ni-SDC/SDC/PBC | Anode | 1484 @ 600° C. | J. of the Electrochemical Society, 163, F1115 (2016). |
| Ni-SDC/SDC/PBC | Alumina substrate | 1420 @ 600° C. | As disclosed herein |

Figure 17:
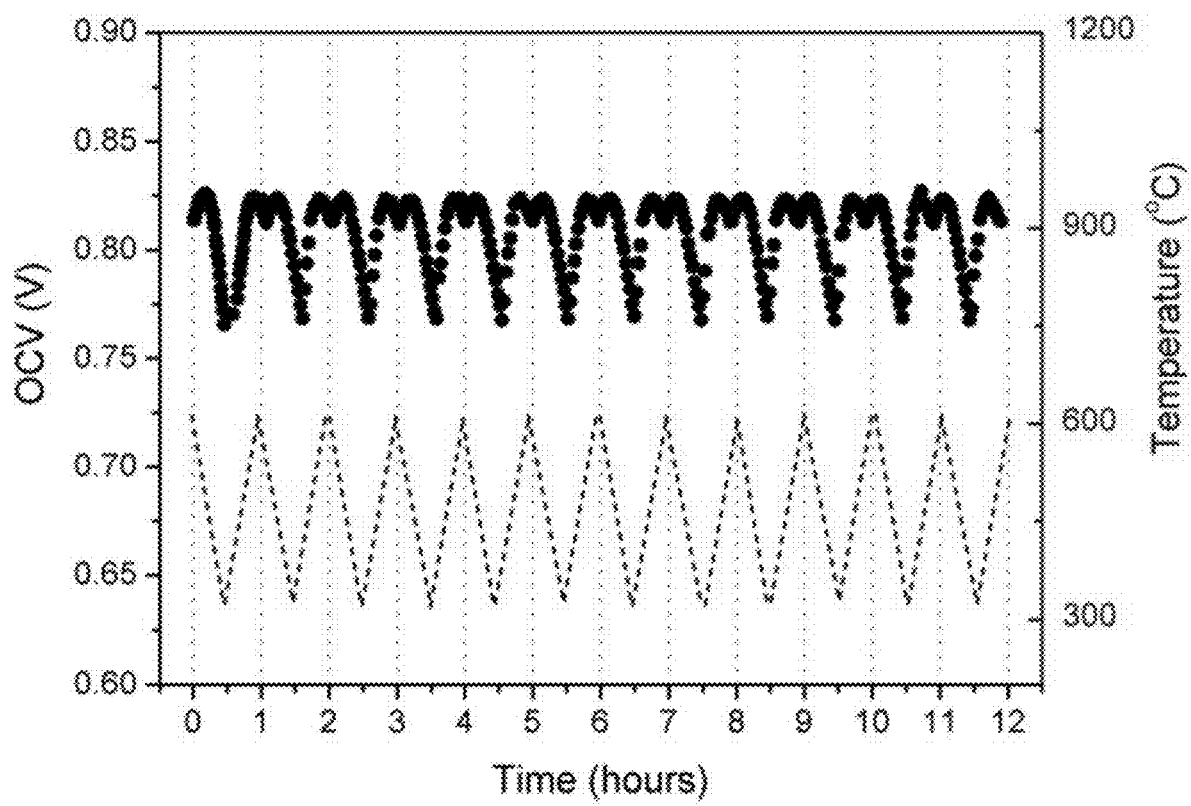
FIG. 17 presents the open circuit voltage of a cell as a function of applied thermal cycles.

The thermal-cycling stability of a micro-tubular alumina substrate supported cell was tested. The operating temperature of the cell was periodically changed between 600° C. and 300° C. with a heating up and cooling rate of 10° C. min$^{-1}$. The dwelling time at each of the two temperatures was 30 min. The OCV was monitored as a function of the elapsed thermal cycles, and results are shown in FIG. 17. After a total of 12 thermal-cycles, the OCVs of the cell did not show obvious degradations, indicating excellent thermal stability of the alumina substrate supported SOFC.

While certain embodiments of the disclosed subject matter have been described using specific terms, such description is for illustrative purposes only, and it is to be understood that changes and variations may be made without departing from the spirit or scope of the subject matter.

What is claimed is:

1. A solid oxide fuel cell comprising:
an alumina substrate comprising a plurality of micro-channels between a first side of the alumina substrate and a second, opposite side of the alumina substrate, the micro-channels including micro-channels that are open on the first side of the alumina substrate and that extend from the first side of the alumina substrate to the second, opposite side of the alumina substrate along an uninterrupted straight line extending from the first side to the second, opposite side;
a first electrode layer adjacent to the second side of the alumina substrate;
an electrolyte layer adjacent to the first electrode layer, wherein the first electrode layer is between the alumina substrate and the electrolyte layer; and
a second electrode layer adjacent to the electrolyte layer, wherein the electrolyte layer is between the first electrode layer and the second electrode layer.

2. The solid oxide fuel cell of claim 1, further comprising a barrier layer between the second side of the alumina substrate and the first electrode layer.

3. The solid oxide fuel cell of claim 1, wherein the solid oxide fuel cell is a microtubular fuel cell.

4. The solid oxide fuel cell of claim 1, wherein the first electrode layer comprises an anode and the second electrode layer comprises a cathode.

5. The solid oxide fuel cell of claim 1, wherein the first electrode layer comprises a cathode and the second electrode layer comprises an anode.

6. The solid oxide fuel cell of claim 1, wherein the alumina substrate exhibits a gas permeability of from about 40×10$^5$ Lm$^{-2}$h$^{-1}$ to about 100×10$^5$ Lm$^{-2}$h$^{-1}$.

7. The solid oxide fuel cell of claim 1, the cell demonstrating a peak power density of from about 1400 mW cm$^{-2}$ at 600° C. to about 1450 mW cm$^{-2}$ at 600° C.

8. The solid oxide fuel cell of claim 1, wherein the alumina substrate comprises a spinel phase.

9. The solid oxide fuel cell of claim 1, wherein the first electrode layer or the second electrode layer comprises a cermet including nickel oxide combined with a ceramic.

10. The solid oxide fuel cell of claim 9, wherein the ceramic comprises ceria or zirconia.

11. The solid oxide fuel cell of claim 1, wherein the first electrode layer or the second electrode layer comprises a praseodymium-doped barium cobalt, a lanthanum strontium cobalt ferrite, or a strontium doped lanthanum manganite.

12. The solid oxide fuel cell of claim 1, wherein the electrolyte layer comprises a ceria-based oxygen ion conductor.

13. The solid oxide fuel cell of claim 1, wherein the first electrode layer, the electrolyte layer, and the second electrode layer each independently have a thickness of about 50 micrometers or less.

14. The solid oxide fuel cell of claim 1, wherein the micro-channels comprise micro-channels having a diameter of approximately 20 micrometers to 30 micrometers.

15. The solid oxide fuel cell of claim 1, wherein the alumina substrate has a thickness of about 500 micrometers or less.

16. A method for forming the solid oxide fuel cell of claim 1 comprising:
    shaping a precursor substrate composition, the precursor substrate composition comprising an alumina powder, a polymeric binder, and a first solvent for the polymeric binder;
    contacting the shaped precursor substrate composition with a first solution comprising a second solvent for the polymeric binder and an anti-solvent to form a green body, the first solution comprising the second solvent and the anti-solvent in a weight ratio of from about 98:2 to about 90:10;
    sintering the green body to form the alumina substrate; and
    forming the first electrode layer, the electrolyte layer, and the second electrode layer on the green body or on the alumina substrate, each of the first electrode layer, the electrolyte layer, and the second electrode layer being independently formed either prior to or following the sintering of the green body.

17. The method of claim 16, wherein the precursor substrate composition is shaped to form a hollow tubular body comprising an internal surface and an external surface, the first solution contacting the internal surface.

18. The method of claim 17, further comprising contacting the external surface with a second solution, the second solution comprising a higher proportion of the anti-solvent as compared to the first solution.

19. The method of claim 18, the second solution being free of any solvent for the polymeric binder.

20. The method of claim 16, wherein the first solvent and the second solvent are the same solvent.

21. The method of claim 16, further comprising forming a porous barrier layer on the green body or on the sintered support prior to forming the first electrode layer.

22. The method of claim 21, wherein the barrier layer, the first electrode layer, and the electrolyte layer are formed on the green body, the sintering step sintering all of the barrier layer, the first electrode layer, and the electrolyte layer, the second electrode layer being subsequently formed on the electrolyte layer.

23. The method of claim 16, the precursor substrate composition further comprising a sintering aide, the sintering aide and the alumina reacting during the sintering to form a spinel phase.

* * * * *